(12) United States Patent
Lehtiniemi et al.

(10) Patent No.: US 10,678,318 B2
(45) Date of Patent: Jun. 9, 2020

(54) TRANSITION OF A HEAD MOUNTED DISPLAY FROM OPERATION IN A FIRST POWER MODE TO OPERATION IN A SECOND POWER MODE

(71) Applicant: NOKIA TECHNOLOGIES OY, Espoo (FI)

(72) Inventors: Arto Lehtiniemi, Lempäälä (FI); Miikka Vilermo, Siuro (FI); Lasse Laaksonen, Tampere (FI); Mikko Tammi, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 142 days.

(21) Appl. No.: 15/579,994

(22) PCT Filed: Jun. 3, 2016

(86) PCT No.: PCT/FI2016/050399
§ 371 (c)(1),
(2) Date: Dec. 6, 2017

(87) PCT Pub. No.: WO2016/198742
PCT Pub. Date: Dec. 15, 2016

(65) Prior Publication Data
US 2019/0220080 A1  Jul. 18, 2019

(30) Foreign Application Priority Data

Jun. 9, 2015 (EP) .................................. 15171092

(51) Int. Cl.
*G06F 1/26* (2006.01)
*G06F 1/32* (2019.01)
(Continued)

(52) U.S. Cl.
CPC .............. *G06F 1/3218* (2013.01); *G06F 1/163* (2013.01); *G06F 1/324* (2013.01); *G06F 1/3206* (2013.01); *G06F 1/3287* (2013.01); *Y02D 10/171* (2018.01)

(58) Field of Classification Search
CPC ........ G06F 1/3218; G06F 1/324; G06F 1/163; G06F 1/3287; G06F 1/3206; Y02D 10/171; G02B 27/017
See application file for complete search history.

(56) References Cited

U.S. PATENT DOCUMENTS 8,898,496 B1  11/2014 Chi
2013/0197793 A1  8/2013 Vaddadi et al.
(Continued)

FOREIGN PATENT DOCUMENTS

JP  2014503085 A  2/2014
KR  20140116915 A  10/2014
(Continued)

OTHER PUBLICATIONS

International Search Report & Written Opinion dated Sep. 1, 2016 corresponding to International Patent Application No. PCT/FI2016/050399.
(Continued)

*Primary Examiner* — Xuxing Chen
(74) *Attorney, Agent, or Firm* — Squire Patton Boggs (US) LLP

(57) ABSTRACT

A method comprising determining that an interactable object is within a field of view of a head mounted display while the head mounted display is operating in a first power mode, and transitioning the head mounted display from operation in the first power mode to operation in a second power mode based, at least in part, on the determination that the interactable object is within the field of view, such that the head mounted display consumes more power during operation in the second power mode than during operation in the first power mode is disclosed.

14 Claims, 9 Drawing Sheets

---

702 — Determine that an interactable object fails to be within a field of view of a head mounted display while the head mounted display is operating in a first power mode 704 — Transition the head mounted display from operation in the first power mode to operation in a second power mode based on the determination that the interactable object fails to be within the field of view, such that the head mounted display consumes less power during operation in the second power mode than during operation in the first power mode

(51) Int. Cl.
  *G06F 1/3218*   (2019.01)
  *G06F 1/3287*   (2019.01)
  *G06F 1/16*     (2006.01)
  *G06F 1/3206*   (2019.01)
  *G06F 1/324*    (2019.01)

(56) References Cited

U.S. PATENT DOCUMENTS

2016/0268678 A1\* 9/2016 Agardh .................... H01Q 3/24
2018/0181810 A1\* 6/2018 Jhawar .................... G06F 3/012
2019/0075254 A1\* 3/2019 Jhawar ................... H04N 5/272

FOREIGN PATENT DOCUMENTS

KR        20150033431 A    4/2015
WO   WO 2012/040030 A2   2/2012
WO       2014147686 A1   9/2014

OTHER PUBLICATIONS

Jul. 25, 2019 Office Action issued in European Patent Application No. 15171092.8.
Korean Office Action issued in corresponding Korean Patent Application No. 10-2018-7000684 dated May 27, 2019.
Final Notice of Preliminary Rejection dated Nov. 26, 2019 corresponding to Korean Patent Application No. 2018-7000684, with concise statement of relevance.

\* cited by examiner

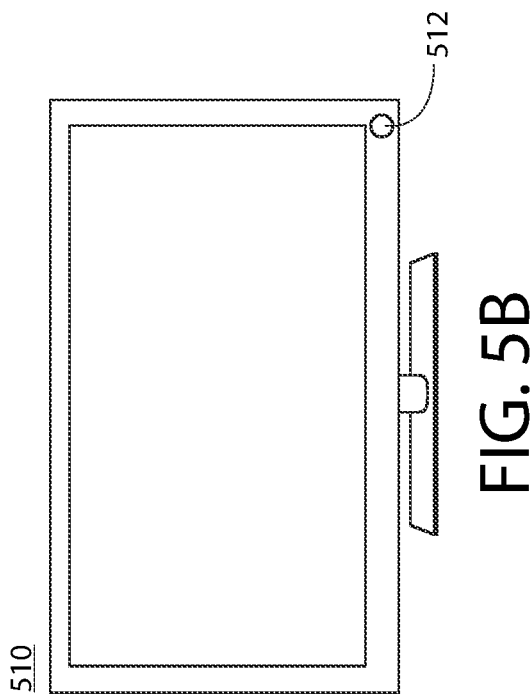
FIG. 5A
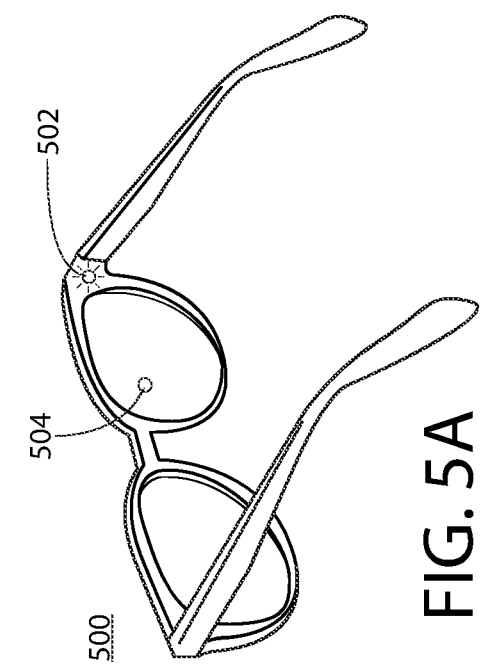
FIG. 5B
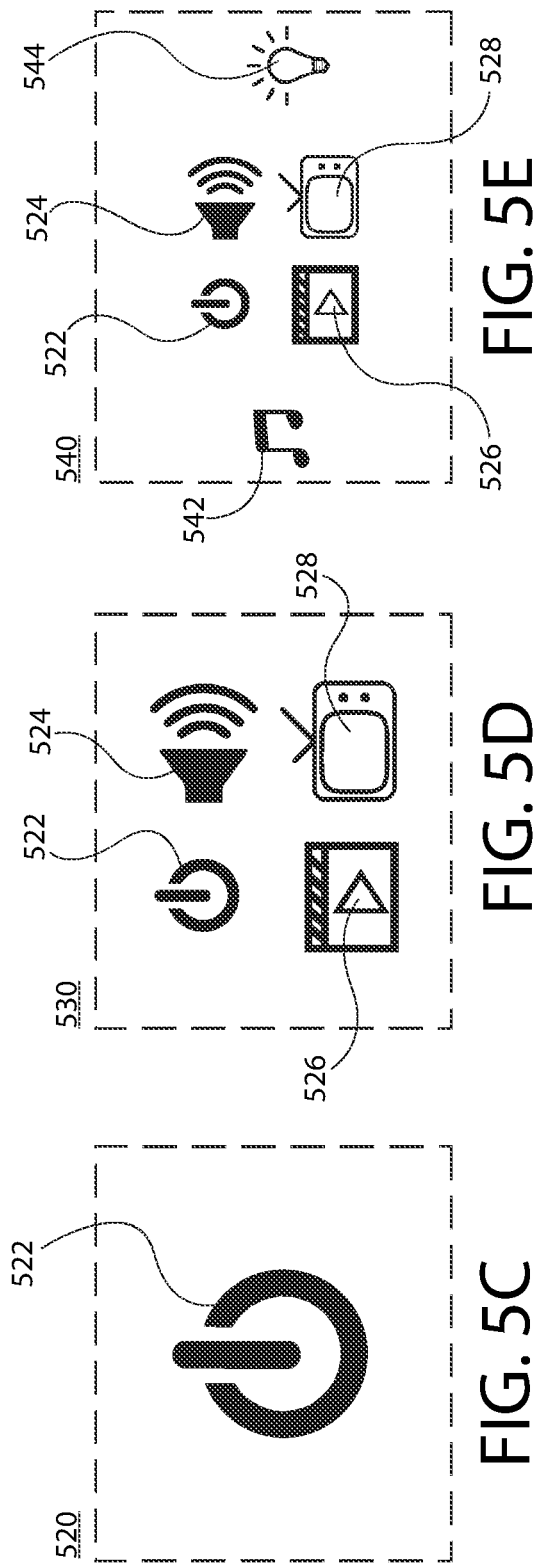
FIG. 5C
FIG. 5D
FIG. 5E

TRANSITION OF A HEAD MOUNTED DISPLAY FROM OPERATION IN A FIRST POWER MODE TO OPERATION IN A SECOND POWER MODE

TECHNICAL FIELD

The present application relates generally to transition of a head mounted display from operation in a first power mode to operation in a second power mode.

BACKGROUND

In modern times, electronic apparatus are often powered by a power source, such as electrical batteries, electrical cells, and/or the like that have a limited power storage capacity. Such electronic devices may operate for extended periods without having their power sources recharged. As such, it may be desirable to configure an apparatus such that the apparatus utilizes the power source in a manner that conserves the limited power of the power source.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for determining that an interactable object is within a field of view of a head mounted display while the head mounted display is operating in a first power mode, and transitioning the head mounted display from operation in the first power mode to operation in a second power mode based, at least in part, on the determination that the interactable object is within the field of view, such that the head mounted display consumes more power during operation in the second power mode than during operation in the first power mode.

One or more example embodiments may provide an apparatus, a computer readable medium, a computer program product, and/or a non-transitory computer readable medium having means for determining that an interactable object is within a field of view of a head mounted display while the head mounted display is operating in a first power mode, and means for transitioning the head mounted display from operation in the first power mode to operation in a second power mode based, at least in part, on the determination that the interactable object is within the field of view, such that the head mounted display consumes more power during operation in the second power mode than during operation in the first power mode.

An apparatus comprising at least one processor and at least one memory, the memory comprising machine-readable instructions, that when executed cause the apparatus to perform determination that an interactable object is within a field of view of a head mounted display while the head mounted display is operating in a first power mode, and transitioning of the head mounted display from operation in the first power mode to operation in a second power mode based, at least in part, on the determination that the interactable object is within the field of view, such that the head mounted display consumes more power during operation in the second power mode than during operation in the first power mode.

In at least one example embodiment, the transition of the head mounted display from operation in the first power mode to operation in the second power mode is in response to the determination that the interactable object is within the field of view.

In at least one example embodiment, the first power mode is a low power mode, and the second power mode is a higher power mode.

In at least one example embodiment, the low power mode is a power mode of the head mounted display that consumes less power than the higher power mode.

In at least one example embodiment, power consumed by the head mounted display in the higher power mode is greater than power consumed by the head mounted display in the low power mode.

In at least one example embodiment, power consumed by the head mounted display for purposes of display of information in the higher power mode is greater than power consumed by the head mounted display for purposes of display of information in the low power mode.

In at least one example embodiment, illumination of a display of the head mounted display in the second power mode is greater than illumination of the display in the first power mode.

In at least one example embodiment, the transition of the head mounted display from operation in the first power mode to operation in the second power mode comprises increase of illumination of a display of the head mounted display.

In at least one example embodiment, the increase of illumination of the display comprises initiation of illumination of the display.

In at least one example embodiment, information rendered by a display of the head mounted display in the second power mode is greater than information rendered by the display in the first power mode.

In at least one example embodiment, the transition of the head mounted display from operation in the first power mode to operation in the second power mode comprises increase of information rendered by a display of the head mounted display.

In at least one example embodiment, the increase of information rendered by the display comprises enablement of the display.

In at least one example embodiment, power consumed by graphics processing hardware in the second power mode is greater than power consumed by graphics processing hardware in the first power mode.

In at least one example embodiment, the transition of the head mounted display from operation in the first power mode to operation in the second power mode comprises increase of power consumed by graphics processing hardware.

In at least one example embodiment, the increase of power consumed by graphics processing hardware comprises disablement of a low power mode of the graphics processing hardware.

In at least one example embodiment, the increase of power consumed by graphics processing hardware comprises enablement of the graphics processing hardware.

In at least one example embodiment, power consumed by non-video hardware in the second power mode is equivalent to power consumed by non-video hardware in the first power mode.

In at least one example embodiment, the transition of the head mounted display from operation in the first power mode to operation in the second power mode avoids change of power consumed by non-video hardware.

In at least one example embodiment, the interactable object is an object which may be interacted with by way of the head mounted display.

One or more example embodiments further perform causation of display, by the head mounted display, of at least one user interface element associated with the interactable object.

In at least one example embodiment, the interactable object is a separate apparatus.

One or more example embodiments further perform causation of display, by the head mounted display, of at least one user interface element associated with the separate apparatus.

In at least one example embodiment, the causation of display of the user interface element associated with the separate apparatus is in response to the transition of the head mounted display from operation in the first power mode to operation in the second power mode.

In at least one example embodiment, the field of view of the head mounted display is a field of view of at least one sensor comprised by the head mounted display.

In at least one example embodiment, the sensor is a camera module, and the field of view of the sensor is a field of view of the camera module.

In at least one example embodiment, the sensor is an infrared sensor, and the field of view of the sensor is a field of view of the infrared sensor.

In at least one example embodiment, the field of view of the head mounted display at least partially corresponds with a field of view of a user wearing the head mounted display.

In at least one example embodiment, the determination that the interactable object is within the field of view of the head mounted display comprises determination that the interactable object is at least partially within the field of view of the head mounted display.

In at least one example embodiment, the determination that the interactable object is within the field of view of the head mounted display comprises receipt of a signal from the interactable object, determination of telemetry of the signal, and determination that the interactable object is within the field of view of the head mounted display based, at least in part, on the telemetry of the signal.

In at least one example embodiment, the signal is a Bluetooth signal, the determination of the telemetry of the signal comprises determination of an angle-of-arrival of the Bluetooth signal from the interactable object, and the determination that the interactable object is within the field of view of the head mounted display is based, at least in part, on the angle-of-arrival of the Bluetooth signal.

In at least one example embodiment, the signal is an audio signal, the determination of the telemetry of the signal comprises determination of an interactable object location based, at least in part, on the audio signal, and the determination that the interactable object is within the field of view of the head mounted display is based, at least in part, on the interactable object location.

One or more example embodiments further perform determination that an automatic transition setting is enabled.

In at least one example embodiment, the transition of the head mounted display from operation in the first power mode to operation in the second power mode is based, at least in part, on the determination that the automatic transition setting is enabled.

One or more example embodiments further perform causation of display of an interaction indicator based, at least in part, on the determination that the interactable object is within the field of view of the head mounted display, the interaction indicator being indicative of the interactable object being within the field of view of the head mounted display.

One or more example embodiments further perform receipt of information indicative of a transition initiation input.

In at least one example embodiment, the transition of the head mounted display from operation in the first power mode to operation in the second power mode is based, at least in part, on the transition initiation input.

In at least one example embodiment, the interaction indicator is associated with the interactable object.

In at least one example embodiment, the interaction indicator is displayed on the head mounted display such that a user wearing the head mounted display perceives the interaction indicator as corresponding with the interactable object when viewed through the head mounted display.

In at least one example embodiment, the interactable object is a separate apparatus.

One or more example embodiments further perform causation of sending of an interaction indicator directive to the separate apparatus based, at least in part, on the determination that the interactable object is within the field of view of the head mounted display, the interaction indicator directive being configured to cause the separate apparatus to cause display of an interaction indicator.

In at least one example embodiment, the determination that the interactable object is within the field of view of the head mounted display comprises determination that the interactable object is within the field of view of the head mounted display for a threshold duration.

In at least one example embodiment, the transition of the head mounted display from operation in the first power mode to operation in the second power mode is based, at least in part, on the determination that the interactable object is within the field of view of the head mounted display for the threshold duration.

In at least one example embodiment, the determination that the interactable object is within the field of view of the head mounted display comprises determination that the interactable object is within the field of view of the head mounted display for a threshold duration.

In at least one example embodiment, the transition of the head mounted display from operation in the first power mode to operation in the second power mode is in response to the determination that the interactable object is within the field of view of the head mounted display for the threshold duration.

One or more example embodiments further perform causation of display of at least one user interface element associated with invocation of at least one action associated with the interactable object based, at least in part, on the determination that the interactable object is within the field of view of the head mounted display.

One or more example embodiments further perform causation of display of at least one user interface element associated with invocation of at least one action associated with the interactable object based, at least in part, on the transition of the head mounted display from operation in the first power mode to operation in the second power mode.

One or more example embodiments further perform determination that at least another interactable object is within the field of view of the head mounted display, and causation of display of at least another user interface element associated with invocation of at least one action associated with the other interactable object.

In at least one example embodiment, the other user interface element is displayed at a position on the head mounted display that is adjacent to a display position of the user interface element on the head mounted display.

One or more example embodiments further perform determination that the interactable object fails to be within the field of view while the head mounted display is operating in the second power mode, and transition the head mounted display from operation in the second power mode to operation in the first power mode based, at least in part, on the determination that the interactable object fails to be within the field of view, such that the head mounted display consumes less power during operation in the first power mode than during operation in the second power mode.

In at least one example embodiment, the transition of the head mounted display from operation in the second power mode to operation in the first power mode comprises reduction of illumination of a display of the head mounted display.

In at least one example embodiment, the reduction of illumination of the display comprises termination of illumination of the display.

In at least one example embodiment, the transition of the head mounted display from operation in the second power mode to operation in the first power mode reduction of information rendered by a display of the head mounted display.

In at least one example embodiment, the reduction of information rendered by the display comprises disablement of the display.

In at least one example embodiment, the transition of the head mounted display from operation in the second power mode to operation in the first power mode comprises reduction of power consumed by graphics processing hardware.

In at least one example embodiment, the reduction of power consumed by graphics processing hardware comprises enablement of a low power mode of the graphics processing hardware.

In at least one example embodiment, the reduction of power consumed by graphics processing hardware comprises disablement of the graphics processing hardware.

In at least one example embodiment, the transition of the head mounted display from operation in the second power mode to operation in the first power mode avoids change of power consumed by non-video hardware.

BRIEF DESCRIPTION OF THE DRAWINGS

For a more complete understanding of one or more example embodiments, reference is now made to the following descriptions taken in connection with the accompanying drawings in which:

FIGS. 5A-5E are diagrams illustrating interaction indicators and user interface elements according to at least one example embodiment;

DETAILED DESCRIPTION OF THE DRAWINGS

Figure 1:
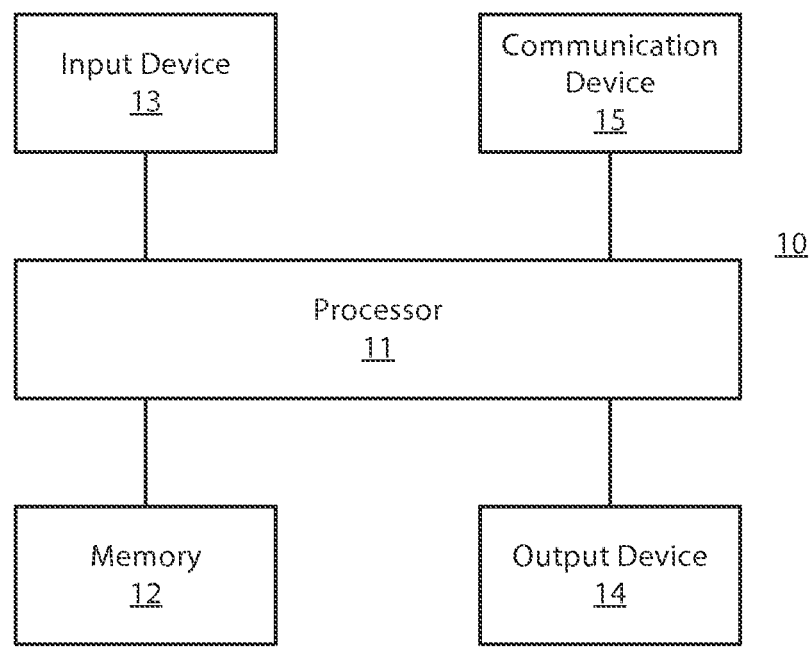
FIG. 1 is a block diagram showing an apparatus according to at least one example embodiment.

Various example embodiments and some of their potential advantages are understood by referring to FIGS. 1 through 11 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, a head mounted display, a see-through display, a near eye display, an augmented reality display, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

Figure 2:
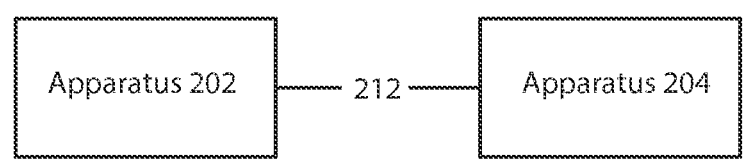
FIG. 2 is a diagram illustrating apparatus communication according to at least one example embodiment.

FIG. 2 is a diagram illustrating apparatus communication according to at least one example embodiment. The example of FIG. 2 is merely an example and does not limit the scope of the claims. For example, apparatus count may vary, apparatus configuration may vary, communication channels may vary, and/or the like.

In the example of FIG. 2, apparatus 202 is an electronic apparatus. An electronic apparatus may be an electronic apparatus that a user commonly utilizes during performance of various tasks, activities, and/or the like. For example, apparatus 202 may be an electronic apparatus that the user frequently utilizes to view map information, to browse map information, to search for points of interests, to provide routing information which may be used to travel to a particular destination, etc. For example, the electronic apparatus may be a phone, a tablet, a computer, a laptop, a near eye apparatus, and/or the like. In the example of FIG. 2, apparatus 204 is a separate apparatus, such as a separate electronic apparatus. For example, separate electronic apparatus may be used collaboratively with the electronic apparatus, in conjunction with the apparatus, in addition to the electronic apparatus, such that the separate apparatus is supporting one or more services associated with the electronic apparatus, and/or the like. In another example, the separate electronic apparatus may be utilized to store information associated with the electronic apparatus, to process information received from the electronic apparatus, and/or the like. For example, a separate electronic apparatus may be a phone, a tablet, a computer, a laptop, a server, a database, a cloud platform, a near eye apparatus, and/or the like. Although the aforementioned example describes apparatus 202 and apparatus 204 as distinct types of apparatuses, namely, an electronic apparatus and a separate electronic apparatus, in some circumstances, the apparatuses may both be electronic apparatuses, both be separate electronic apparatuses, and/or the like.

In the example of FIG. 2, apparatus 202 communicates with apparatus 204 by way of communication channel 212. For example, apparatus 202 may send information to apparatus 204 by way of communication channel 212, apparatus 202 may receive information sent from apparatus 204 by way of communication channel 212, and/or the like. A communication channel, for example, may be a channel utilized for sending and/or receiving of information, data, communications, and/or the like, between two or more apparatuses. It should be understood that, even though the example of FIG. 2 illustrates a direct communication channel between apparatus 202 and apparatus 204, there may be intermediate apparatuses that facilitate communication between apparatus 202 and apparatus 204. For example, there may be one or more routers, hubs, switches, gateways, and/or the like, that are utilized in the communication channels between apparatus 202 and apparatus 204. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, an apparatus may be a phone, a tablet, a computer, a display, a monitor, a head mounted display, a see through display, a wearable apparatus, a head worn apparatus, a hand worn apparatus, an electronic apparatus, a peripheral apparatus, a host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2, apparatus 202 communicates with apparatus 204 by way of a communication channel 212. In the example of FIG. 2, communication channel 212 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2, apparatus 202 communicates with apparatus 204 by way of communication channel 212. In the example of FIG. 2, communication channel 212 may be a local area network communication channel, a wide area network communication channel, an internet communication channel, a cellular communication channel, and/or the like.

Figure 3A:
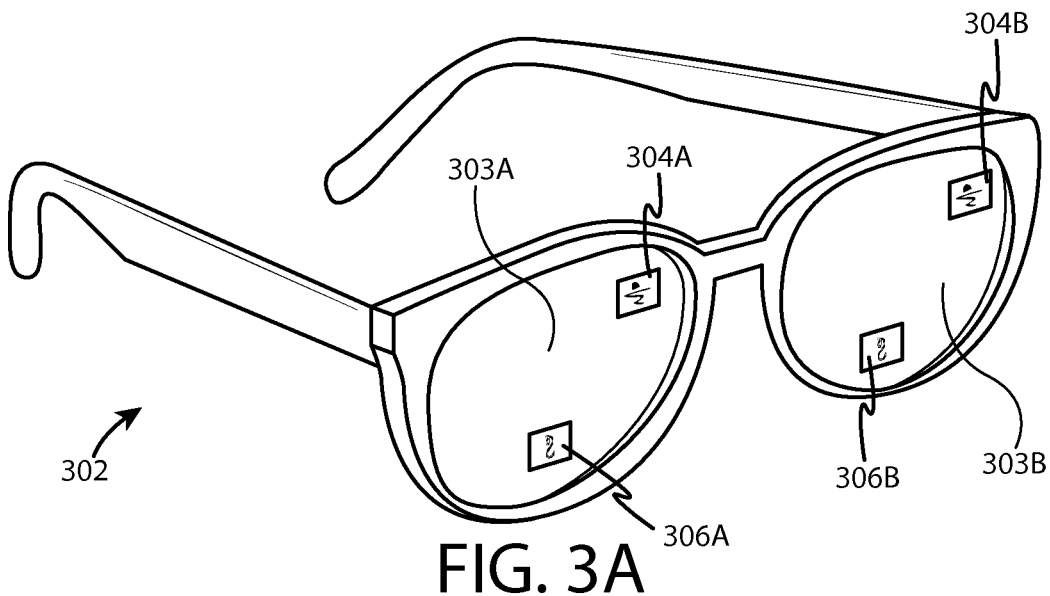
FIGS. 3A-3C are diagrams illustrating head mounted displays according to at least one example embodiment.
Figure 3B:
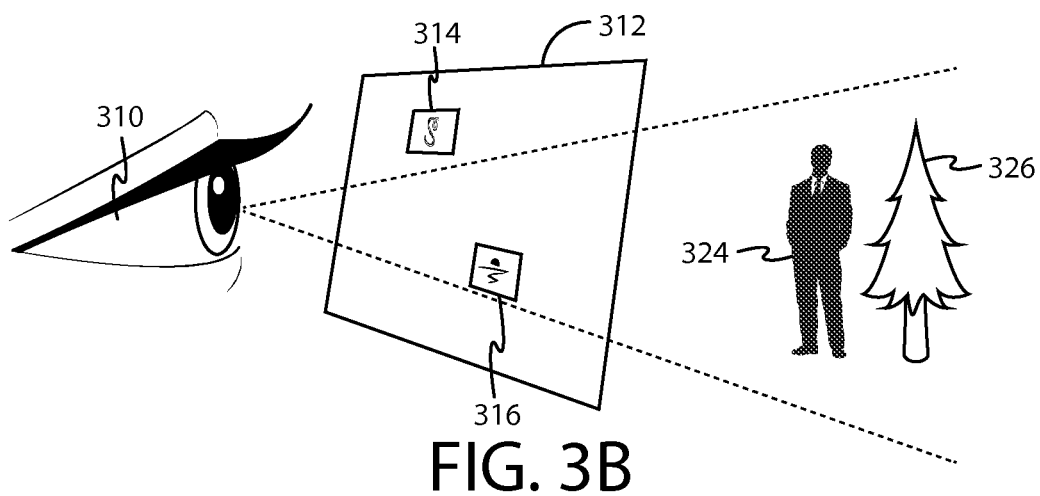
Figure 3C:
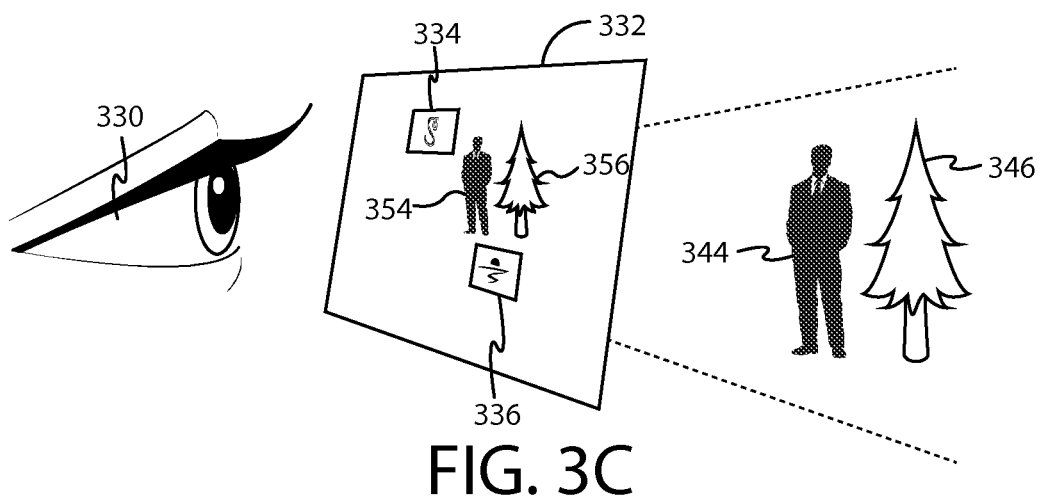

FIGS. 3A-3C are diagrams illustrating head mounted displays according to at least one example embodiment. The examples of FIGS. 3A-3C are merely examples and do not limit the scope of the claims. For example, the display type may vary, the configuration of the display may vary, the shape of the display may vary, and/or the like.

In many circumstances, a user may desire to interact with an electronic apparatus. In such circumstances, it may often be desirable for the user to interact with an electronic apparatus by way of a head mounted display. For example, the user may interact with a program interaction screen associated with a program. In some circumstances, it may be desirable for a head mounted display to be a see through display. In at least one example embodiment, a see through display is a display that presents information to a user, but through which objects on an opposite side of the display from the user may be seen. A see through display may be comprised by a window, a windshield, a visor, glasses, and/or the like. A head mounted display may, for example, be a display that is head mountable, a display that is coupled to an element that is wearable at a location on and/or proximate to the head of a user, a display that is wearable at a location on and/or proximate to the head of a user, and/or the like. In at least one example embodiment, a head mounted display is a see through head mounted display.

FIG. 3A is a diagram illustrating display 302 according to at least one example embodiment. In the example of FIG. 3A, display 302 is illustrated as a see through display, though display 302 may be any type of display. For example, display 302 may be a non-see through display. In at least one example embodiment, a see through display is a near eye display. A near eye display may be a see through display that is positioned proximate to an eye of the user. The example of FIG. 3A illustrates display 302 as glasses that comprise a near eye display in each lens. In the example of FIG. 3A, right near eye display 303A is displaying information 304A and 306A, and left near eye display 303B is displaying information 304B and 306B. In at least one example embodiment, information 304A may be associated with information 304B. For example, the content of information 304A may be identical to content of information 304B. In some circumstances, even though the content may be identical between 304A and 304B, position of information 304A on the right near eye display may vary from position of information 304B on the left near eye display. In this manner, the apparatus may vary position of information between the left near eye display and right near eye display to vary the parallax of the information perceived by the user. In this manner, the apparatus may vary the perceived depth of the information by the user.

In some circumstances, a display, such as display 302 of FIG. 3A, may display information with a particular illumination level, the display as a whole may have an illumination level, and/or the like. For example, the display may comprise a backlight, and the backlight may have various illumination levels in different circumstances. For example, the backlight may have a low illumination level when the ambient lighting conditions near the display are dim, and the backlight may have a high illumination level when the ambient lighting conditions near the display are bright. In at least one example embodiment, a display is illuminated.

FIG. 3B is a diagram illustrating see through display 312 according to at least one example embodiment. In at least one example embodiment, displaying information on a see through display so that the information corresponds with one or more objects viewable through the see through display is referred to as augmented reality. In the example of FIG. 3B, user 310 may perceive objects 324 and 326 through see through display 312. In at least one example embodiment, the see through display may display information to the user. For example, display 312 may display information 314 and information 316. Information 314 and information 316 may be positioned on display 312 such that the information corresponds with one or more objects viewable through see through display 312, such as object 324. In such an example, information 314 may be associated with, identify, and/or the like, object 324. For example, information 314 may indicate an identity of object 324. In at least one example embodiment, display 312 may be comprised by a head mounted display.

FIG. 3C is a diagram illustrating display 332 according to at least one example embodiment. In at least one example embodiment, displaying information on a display so that the information corresponds with one or more representations of objects displayed on the display is referred to as augmented reality. In some circumstances, a representation of an object may refer to an image of an object. For example, a camera module may capture camera information that comprises information indicative of the object. The camera information may comprise video information, image information, and/or the like. This camera information may then be displayed on a display such that the camera information is a representation of the object. In the example of FIG. 3C, user 330 may perceive representations 354 and 356 displayed on display 332. Representations 354 and 356 may be images of objects captured by an apparatus. For example, a camera module may capture camera information indicative of objects 344 and 346 such that the camera information is displayed on display 332 as representations 354 and 356. In at least one example embodiment, the display may display information to the user. For example, display 332 may display information 334 and information 336. Information 334 and information 336 may be positioned on display 332 such that the information corresponds with one or more representations of objects displayed on display 332, such as representation 354. In such an example, information 334 may be associated with, identify, and/or the like, representation 354. For example, information 334 may indicate an identity of representation 354. In at least one example embodiment, display 332 may be comprised by a head mounted display.

Figure 4A:
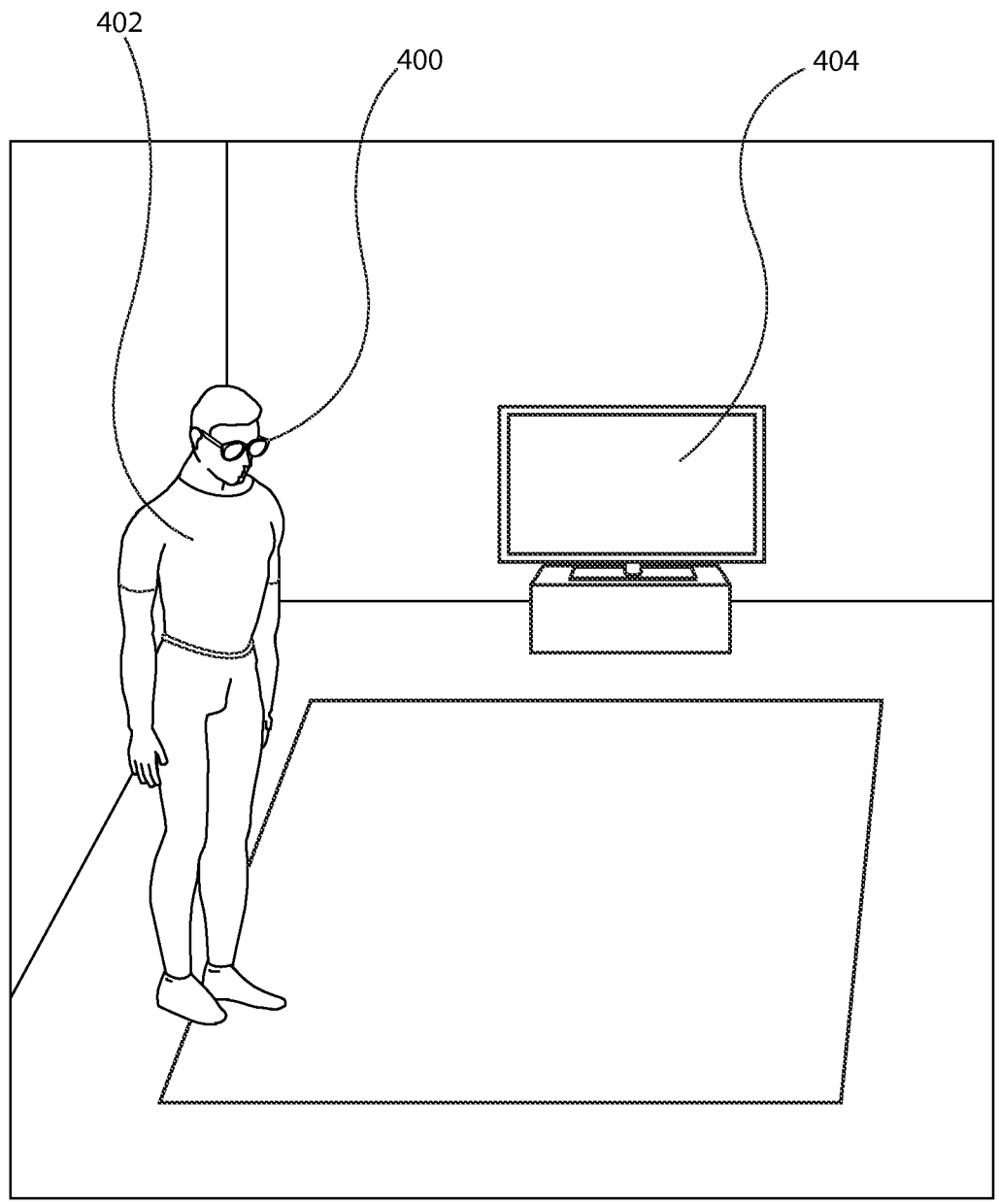
FIGS. 4A-4C are diagrams illustrating a field of view of a head mounted display according to at least one example embodiment.
Figure 4B:
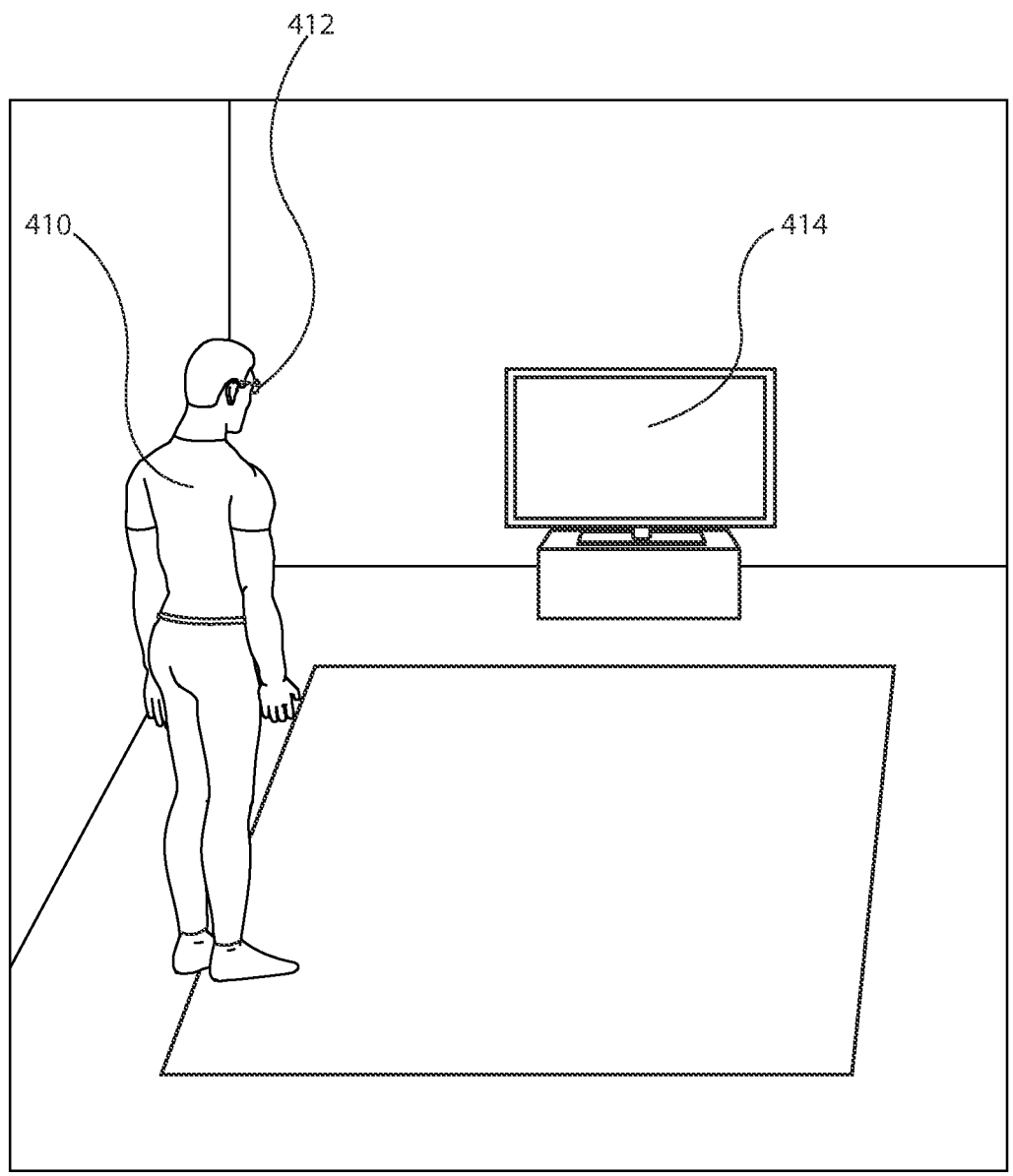
Figure 4C:
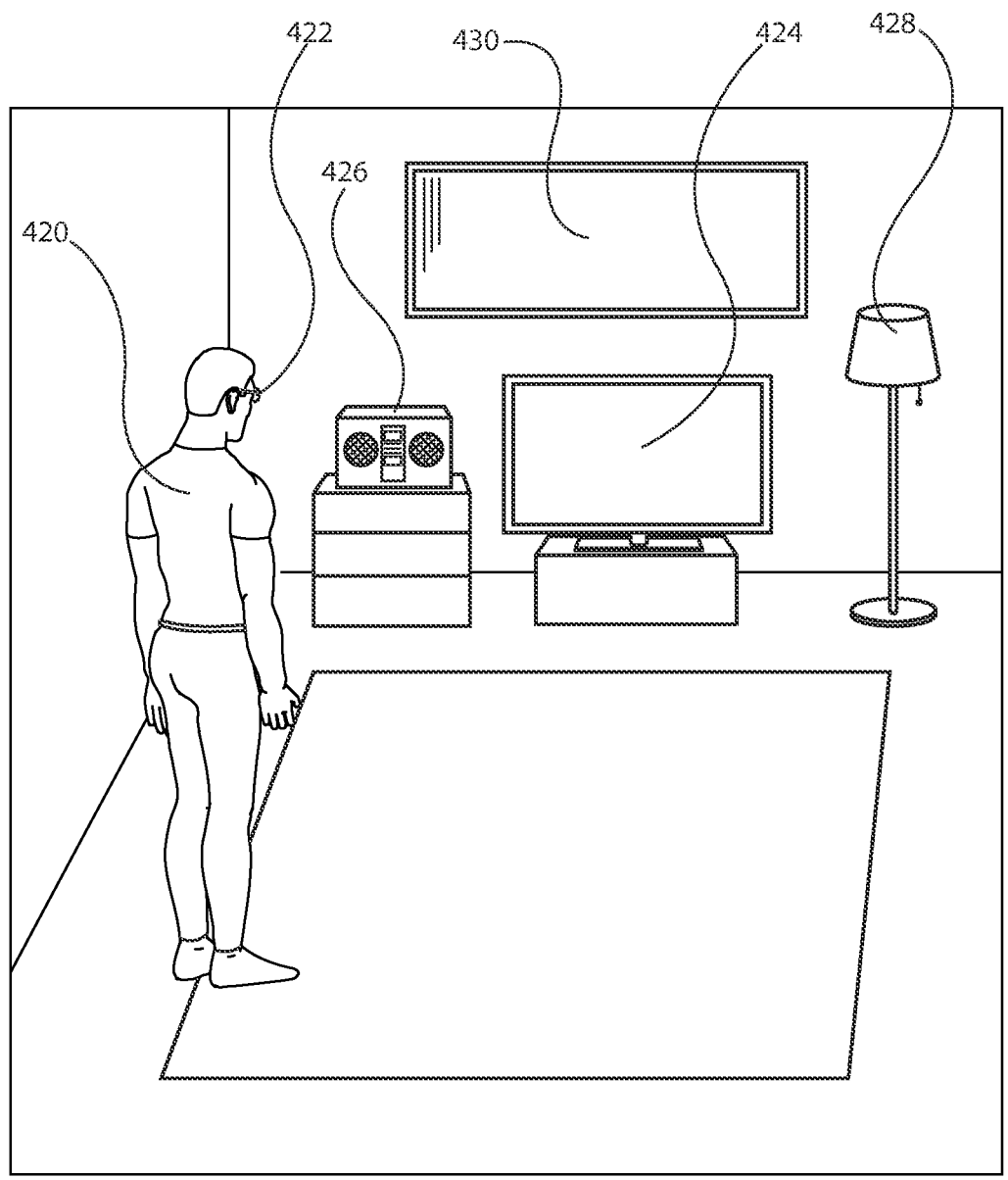

FIGS. 4A-4C are diagrams illustrating a field of view of a head mounted display according to at least one example embodiment. The examples of FIGS. 4A-4C are merely examples and do not limit the scope of the claims. For example, head mounted display design, configuration, etc. may vary, field of view may vary, interactable object design, configuration, etc. may vary, and/or the like.

In some circumstances, a head mounted display, such as display 202 of FIG. 2A, may comprise a power source that has a limited power storage capacity, such as an electrical battery, an electrical cell, a capacitor, and/or the like. For example, a head mounted display may utilize an electrical battery to power components comprised by the head mounted display, and the battery may have a particular nominal voltage, have a maximum current rating, a particular ampere-hour capacity, and/or the like. A power source with a limited power storage capacity, such as an electrical battery, may occasionally need to be recharged. For example, a head mounted display comprising an electrical battery may deplete the stored power of the electrical battery after some period of use. In some circumstances, a user may be unable to recharge a power source. For example, the user may be traveling and may have failed to travel with a charging station for the power source (e.g. a battery charger, a transformer, and/or the like), a power receptacle (e.g. an AC mains power receptacle, DC power receptacle from a vehicle, and/or the like) may be unavailable, and/or the like. In circumstances where a user may be unable to charge a power source, it may be desirable to limit consumption of the power from the power source.

In other circumstances, it may be undesirable to charge a power source. For example, an available charging source may have a limited capacity, the head mounted display may be in use and charging the head mounted display may reduce the usability of the head mounted display (e.g. the head mounted display may become less mobile), and/or the like. In circumstances such as these, it may be desirable to operate the head mounted display in one or more power modes that consume less power than a different power mode of the head mounted display. In this manner, the power stored within the power source may be conserved. For example, it may be desirable to operate the head mounted display in a power mode that consumes less power during periods when an object (e.g. an interactable object, similar as later described) fails to be within a field of view of the head mounted display, and to operate the head mounted display in a different power mode that consumes more power during periods when an interactable object is within a field of view of the head mounted display.

For example, in some circumstances, a user may desire to utilize a head mounted display in conjunction with one or more interactable objects. An interactable object may be, for example, an object which may be interacted with by way of the head mounted display. For example, the interactable object may be a separate apparatus that may be interacted with by way of the head mounted display, the interactable object may be a physical object that is associated with display of information in an augmented reality fashion, similar as described regarding FIGS. 3A-3C, and/or the like. In such an example, a user wearing the head mounted display may identify a particular interactable object with which the user desires to interact. The user may interact with the interactable object by way of viewing the interactable object while wearing the head mounted display. For example, the user may position the head mounted display such that the interactable object is in a field of view of the head mounted display. In such an example, while the user is wearing the head mounted display, the user may position user's head such that the user may perceive the interactable object through the head mounted display, and may perceive information associated with the interactable object that is displayed by way of the head mounted display.

In this manner, it may be desirable to conserve more power in circumstances in which there fails to be an interactable object in the field of view of the head mounted display, and to conserve less power in circumstances in which there is an interactable object in the field of view of the head mounted display. For example, while the interactable object is in the field of view of the head mounted display and the user is perceiving information associated with the interactable object by way of a display of the head mounted display, it may be desirable to provide the user with a higher level of performance, additional processing associated with a head mounted display, additional power consumption associated with display of such information, and/or the like. In at least one example embodiment, a head mounted display may be operated in at least a first power mode and a second power mode. In such an example embodiment, the first power mode may be a low power mode, and the second power mode may be a higher power mode. For example, the low power mode may be a power mode of the head mounted display that consumes less power than the higher power mode. In this manner, power consumed by the head mounted display in the higher power mode may be greater than power consumed by the head mounted display in the low power mode.

A low power mode may refer to a power mode of the head mounted display that consumes less power than a higher power mode. For example, during a low power mode, one or more components of a video pipeline (e.g. one or more graphics processing components, a graphical processing unit, random access memory associated with a graphical processing unit, etc.) may be operated in a low power mode (e.g. at a lower clock speed), disabled such that the component does not draw power, and/or the like. In at least one example embodiment, power consumed by a head mounted display when operating in a low power mode is less than power consumed by the head mounted display when operating in a higher power mode.

A higher power mode may refer to a power mode of the head mounted display that that consumes more power than a low power mode. For example, during a higher power mode, one or more components of a video pipeline may be operated in a non-low power mode (e.g. at a higher clock speed), enabled such that the component draws power, and/or the like. In at least one example embodiment, power consumed by a head mounted display when operating in a higher power mode is greater than power consumed by the head mounted display when operating in a low power mode. As previously described, in some circumstances information may be rendered on a display. In at least one example embodiment, information is caused to be rendered on a display, comprised by a head mounted display, in a higher power mode.

As previously described, in some circumstances, a head mounted display may utilize different power modes depending on whether an interactable object is within a field of view of the head mounted display. For example, a head mounted display may utilize one or more power modes for purposes of display of information. As previously described, a particular power mode, such as a low power mode, may consume less power than a different power mode, such as a higher power mode. In at least one example embodiment, power consumed by a head mounted display for purposes of display of information in a higher power mode is greater than power consumed by the head mounted display for purposes of display of information in a low power mode.

In some circumstances, power consumed by a head mounted display may vary based, at least in part, on the illumination of a display comprised by the head mounted display. For example, a backlight comprised by the display may draw more power when the illumination level is high, and may draw less power when the illumination level is low. For example, when the illumination level is high, the display may draw more current, operate at a higher voltage, operate at a higher wattage, consume more ampere-hours of electric charge over a period of time, and/or the like than when the illumination level is low. In circumstances such as these, it may be desirable to vary the illumination level of one more displays comprised by the head mounted display based, at least in part, on the power mode of the head mounted display. For example, it may be desirable for the head mounted display to operate with a low illumination level during a low power mode. In this manner, the head mounted display may draw less power during the low power mode. In at least one example embodiment, illumination of a display of a head mounted display in a higher power mode is greater than illumination of the display of the head mounted display in a low power mode.

In some circumstances, power consumed by a head mounted display may vary based, at least in part, on whether a display comprised head mounted display is illuminated. For example, a backlight comprising the display may draw more power when the display is illuminated, and may draw little or no power when the display fails to be illuminated. In circumstances such as these, it may be desirable to terminate illumination of the display based, at least in part, on the power mode of the head mounted display. For example, it may be desirable for the head mounted display to terminate illumination of the display while the head mounted display is operating in a low power mode. In this manner, the head mounted display may draw less power while operating in the low power mode. In at least one example embodiment, reduction of illumination of a display comprises termination of illumination of the display.

In some circumstances, it may be desirable to increase illumination of a display of a head mounted display. For example, information displayed by the display may be difficult to read in circumstances where the illumination level is low and the ambient light level is high. Increasing the illumination of the display may facilitate viewing of information viewed on the display in these circumstances. In some circumstances, a display may fail to be illuminated. For example, as previously described, illumination of a display may have been reduced by terminating illumination of the display. In circumstances such as these, increase of illumination of the display may require initiation of illumination of the display. For example, a backlight comprised by the display may need to be enabled, actuated, lit, etc. in order to illuminate the display. In at least one example embodiment, increase of illumination of a display comprises initiation of illumination of the display.

In some circumstances, power consumed by a head mounted display may vary based, at least in part, on the amount of information displayed by a display comprised by the head mounted display. For example, the display may draw more power when displaying a large amount of information, displaying changing information, displaying higher resolution information, and/or the like, and may draw less power when the display is displaying little or no information, static information, lower resolution information, and/or the like. In at least one example embodiment, information rendered by a display of a head mounted display while the head mounted display is operating in a higher power mode is greater than information rendered by the display of the head mounted display while the head mounted display is operating in a low power mode. In circumstances such as these, it may be desirable to vary the amount and/or type of information rendered on a head mounted display based, at least in part, on the power mode of the head mounted display. For example, it may be desirable for the head mounted display to render less information, to render lower resolution information, to render static information, and/or the like during a low power mode. In this manner, the head mounted display may draw less power while operating in the low power mode.

In some circumstances, power consumed by a head mounted display may vary based, at least in part, on whether a display is enabled or disabled. For example, the display may draw more power when the display is enabled, and may draw little or no power when the display is disabled. In circumstances such as these, it may be desirable to enable or disable the display based, at least in part, on the power mode of the head mounted display. For example, it may be desirable for the head mounted display to disable the display during a low power mode. In this manner, the head mounted display may draw less power while operating in the low power mode. In at least one example embodiment, reduction of information rendered by a display comprises disablement of the display.

In some circumstances, it may be desirable to increase the amount of information rendered on a display. For example, a user may wish to view information on the display, view additional information on a display that is currently displaying information, and/or the like. In some circumstances, a display may fail to be enabled. For example, as previously described, a display may have been disabled. In circumstances such as these, increasing the amount of information rendered may require enablement of the display. For example, the display may need to be turned on to render information on the display. In at least one example embodiment, increase of information rendered by a display comprises enablement of the display.

In some circumstances, power consumed by a head mounted display may vary based, at least in part, on power consumed by graphics processing hardware, such as a graphics processing unit, a video decoder, a display driver, and/or the like, comprised by the head mounted display. For example, graphics processing hardware comprised by the head mounted display may draw may draw less power when the graphics processing hardware is operating in a low power mode. A low power mode may refer to a power mode of the graphics hardware in which the graphics hardware consumes less power. For example, the graphics hardware may operate in a low power mode by way of reducing the clock speed of the graphics hardware, disabling features of the graphics hardware, and/or the like such that the graphics hardware consumes less power. In circumstances such as these, it may be desirable to enable a low power mode of the graphics processing hardware based, at least in part, on the power mode of the head mounted display. For example, it may be desirable for graphics processing hardware to operate with in a low power mode during a low power mode of the head mounted display. In this manner, the head mounted display may draw less power while operating in the low power mode. In at least one example embodiment, reduction of power consumed by graphics processing hardware comprises enablement of a low power mode of the graphics processing hardware.

In some circumstances, power consumed by a head mounted display may vary based, at least in part, on whether graphics processing hardware is enabled or disabled. For example, the display may draw more power when the graphics processing hardware is enabled, and may draw little or no power when the graphics processing hardware is disabled. In circumstances such as these, it may be desirable to enable or disable the display based, at least in part, on the power mode of the head mounted display. For example, it may be desirable for the head mounted display to disable the graphics processing hardware during a low power mode. In this manner, the head mounted display may draw less power while operating in the low power mode. In at least one example embodiment, reduction of power consumed by graphics processing hardware comprises disablement of the graphics processing hardware.

In some circumstances, it may be desirable to disable a low power mode of the graphics processing hardware. For example, rendering information on the display may require features of the graphics processing hardware that are disabled when the lower power mode of the graphics processing hardware is enabled. Disabling the low power mode of the graphics processing hardware may facilitate rendering information on the display in these circumstances. Disabling a low power mode of graphics processing hardware may cause an increase of power consumed by the graphics hardware. For example, disabling a lower power mode of graphics processing hardware may cause the graphics processing hardware to operate at a higher clock rate, enable additional features of the graphics processing hardware, and/or the like. In at least one example embodiment, causing an increase of power consumed by graphics processing hardware comprises disablement of a low power mode of the graphics processing hardware. For example, the apparatus may disable a previously enabled low power mode of the graphics processing hardware.

As previously described, in some circumstances, it may be desirable to increase the amount of information rendered on a display. For example, a user may wish to view information on the display, view additional information on a display that is currently displaying information, view information associated with one or more interactable objects, view one or more user interface elements associated with one or more interactable objects, and/or the like. In some circumstances, graphics processing hardware may fail to be enabled. For example, as previously described, graphics processing hardware may have been disabled. In circumstances such as these, increasing the amount of information rendered may require enablement of graphics processing hardware. For example, the graphics processing hardware may be required to render information on the display. Enabling graphics processing hardware may cause an increase of power consumed by the graphics hardware. For example, enabling the graphics processing hardware may cause the graphics processing hardware to perform operations that consume power. In at least one example embodiment, causing an increase of power consumed by graphics processing hardware comprises enablement of the graphics processing hardware. For example, the apparatus may enable previously disabled graphics processing hardware. As previously described, a particular power mode, such as a low power mode, may consume less power than a different power mode, such as a higher power mode. In at least one example embodiment, power consumed by graphics processing hardware in the higher power mode is greater than power consumed by graphics processing hardware in the low power mode.

In some circumstances, a head mounted display may comprise non-video hardware. Non-video hardware may refer to hardware that is utilized by a head mounted display, at least in part, for purposes other than rendering information on a display. For example, non-video hardware may be used for receiving information from a server, receiving input from a user, receiving information from one or more sensors, determining whether an interactable object is within a field of view of a head mounted display, and/or the like. It should be understood that even though non-video hardware may be utilized for purposes other than rendering information on a display, in some circumstances, non-video hardware may be utilized for rendering information on a display. For example, a processor may be utilized by a video pipeline while also being utilized as non-video hardware. In some circumstances, it may be desirable for non-video hardware to consume power irrespective of the power mode. For example, it may be desirable to preclude non-video hardware from entering a low power mode in circumstances where entering a low power mode may make the non-video hardware unresponsive to inputs, slow to perform operations, unable to receive information from various sensors, and/or the like. In at least one example embodiment, power consumed by non-video hardware in a higher power mode is equivalent to power consumed by non-video hardware in a low power mode. For example, an apparatus may avoid changing the power consumed by non-video hardware by refraining from changing settings of the non-video hardware, precluding termination of operations of the non-video hardware, and/or the like when transitioning from a power mode and a different power mode.

As previously described, in some circumstances, a head mounted display may operate on battery power. In such circumstances, a battery may have a particular power level. For example, battery may have a descriptive power level indicative of its state of charge, such as "high," "full," low," 'empty," and/or the like. In another example, a battery may have a discrete power level such as a measured voltage, a measured amount of ampere-hours remaining, a percentage of battery capacity remaining, and/or the like. A descriptive power level and a discrete power level may correspond. For example, if a battery has a fully charged capacity of 2200 mAh, a low power level may be indicative of a particular percentage of 2200 mAh remaining (e.g. 20%) in the battery. In another example, a high power level may indicated a different percentage higher than the low power percentage (e.g. 80%) is remaining in the battery. In some circumstances, it may be desirable to determine the battery power level of the head mounted display. For example, in circumstances where the battery power level is low, it may be desirable for the display to enable a low power consumption mode, a low power mode, a low power mode of the graphics processing hardware, and/or the like. Battery power level may be determined, for example, by measuring the voltage of the battery, monitoring the ampere-hours consumed by the battery, and/or the like. In at least one example embodiment, a battery power level of the head mounted display is determined.

FIG. 4A is a diagram illustrating a field of view of a head mounted display according to at least one example embodiment. The example of FIG. 4A depicts user 400 wearing head mounted display 402 while standing in a room with interactable object 404. As can be seen in the example of FIG. 4A, interactable object 404 is a television. As can be seen, user 400 is not looking towards interactable object 404. In the example of FIG. 4A, it may be inferred that user 400 does not desire to interact with interactable object 404 by way of head mounted display 402, that interactable object 404 fails to be within a field of view of head mounted display 402, and/or the like. In this manner, it may be desirable to operate head mounted display 402 in a power mode that consumes less power than a different power mode. For example, it may be desirable to operate head mounted display 402 in a low power mode in order to conserve battery power associated with one or more batteries comprised by head mounted display 402 based, at least in part, on interactable object 404 failing to be within a field of view of head mounted display 402.

As discussed previously, in some circumstances, a user may desire to interact with an interactable object by way of a head mounted display worn by the user. In such circumstances, the user may indicate such a desire by looking at the interactable object, while wearing the head mounted display, such that the interactable object is within a field of view of the head mounted display. Further, as discussed previously, it may be desirable to operate a head mounted display in a low power mode when it is likely that the user does not desire to interact with such an interactable object. In this manner, it may be desirable to transition from a power mode, such as a low power mode, to a different power mode, such as a higher power mode, in circumstances in which a head mounted display is reoriented such that an interactable object is within a field of view of the head mounted display. In order to facilitate such operations, it may be desirable to configure an apparatus such that the apparatus may determine whether an interactable object is within a field of view of a head mounted display.

In at least one example embodiment, an apparatus determines that an interactable object is within a field of view of a head mounted display while the head mounted display is operating in a first power mode, such as a low power mode. The field of view of the head mounted display may, for example, at least partially correspond with a field of view of a user wearing the head mounted display. In this manner, a user wearing the head mounted display and perceiving portions of the user's environment through the head mounted display may have a field of view that at least partially corresponds with the field of view of the head mounted display. For example, the field of view of the head mounted display may be larger than, smaller than, etc. the field of view of the user peering through the head mounted display. The determination that the interactable object is within the field of view of the head mounted display may, for example, comprise determination that the interactable object is at least partially within the field of view of the head mounted display. In at least one example embodiment, the field of view of the head mounted display is a field of view of at least one sensor comprised by the head mounted display. For example, the sensor may be a camera module, and the field of view of the sensor may be a field of view of the camera module. In another example, the sensor may be an infrared sensor, and the field of view of the sensor may be a field of view of the infrared sensor. For example, in the example of FIG. 4A, head mounted display 402 may determine that interactable object 404 fails to be within a field of view of head mounted display 402 based, at least in part, on absence of information indicative of interactable object 404 received from a camera module comprised by head mounted display 402, received from an infrared sensor comprised by head mounted display 402, and/or the like.

In some circumstances, it may be desirable to utilize a relative strength of a signal received from an interactable object, a direction from which a signal received from an interactable object, and/or the like in order to determine whether the interactable object is within a field of view of the head mounted display. In at least one example embodiment, an apparatus receives a signal from an interactable object, and determines telemetry of the signal. In such an example embodiment, the telemetry of the signal may be any characteristic of the signal, such as a source of the signal, a location of the source of the signal, a strength of the signal, a type of signal, and/or the like. Such telemetry may, for example, be an angle-of-departure of the signal from the interactable object, an angle-of-arrival of the signal at the head mounted display, a relative strength of the signal received from the interactable object, and/or the like. In this manner, the apparatus may determine a distance of the interactable object from the head mounted display, may determine a position of the interactable object relative to a position of the head mounted display (e.g. azimuth and/or elevation angles of the interactable object from the head mounted display), and/or the like. In at least one example embodiment, an apparatus determines that the interactable object is within the field of view of the head mounted display based, at least in part, on the telemetry of the signal.

For example, the signal may be a Bluetooth signal, and the determination of the telemetry of the signal may comprise determination of an angle-of-arrival of the Bluetooth signal at the interactable object, determination of an angle-of-departure of the Bluetooth signal from the interactable object, a distance of the interactable object from the head mounted display, and/or the like. In such an example embodiment, the determination that the interactable object is within the field of view of the head mounted display may be based, at least in part, on the angle-of-arrival of the Bluetooth signal, the angle-of-departure of the Bluetooth signal, the distance between the interactable object and the head mounted display, and/or the like.

In another example, the signal may be an audio signal, and the determination of the telemetry of the signal may comprise determination of an interactable object location based, at least in part, on the audio signal. For example, the audio signal may be received by way of a plurality of microphones such that the interactable object may be localized based, at least in part, on the audio signal. In this manner, the determination that the interactable object is within the field of view of the head mounted display may be based, at least in part, on the interactable object location, the localization of the audio signal, the localization of the interactable object, and/or the like.

As discussed previously, in some circumstances, it may be desirable to transition a head mounted display from operation in a power mode to operation in a different power mode based, at least in part, on whether an interactable object is present within a field of view of the head mounted display. In at least one example embodiment, an apparatus transitions the head mounted display from operation in the power mode to operation in a different power mode based, at least in part, on the determination that the interactable object is within the field of view, such that the head mounted display consumes more power during operation in the different power mode than during operation in the power mode. In such an example embodiment, the power mode may be a low power mode, and the different power mode may be a higher power mode. In this manner, the higher power mode may enable a user wearing the head mounted display to interact with the interactable object that is within the field of view of the head mounted display, to perceive information associated with the interactable object by way of the head mounted display, and/or the like. In at least one example embodiment, the transition of the head mounted display from operation in the first power mode to operation in the second power mode is in response to the determination that the interactable object is within the field of view.

As previously described, in some circumstances, illumination of a display in a higher power mode may be greater than illumination of the display in a low power mode. In at least one example embodiment, transitioning from a low power mode to a higher power mode comprises increase of illumination of a display. For example, transitioning from a low power mode to a higher power mode may comprise initiation of illumination of the display, increase of illumination of the display, and/or the like.

As previously described, in some circumstances, information rendered by a display in a higher power mode may be greater than information rendered by the display in a low power mode. In at least one example embodiment, transitioning from a low power mode to a higher power mode comprises increase of information rendered by a display. For example, transitioning from a low power mode to a higher power mode may comprise enablement of the display, increasing the amount of information displayed on the display, rendering the information on a display as dynamic information, and/or the like.

As previously described, in some circumstances, power consumed by graphics processing hardware may be increased, for example, by disabling a low power mode of the graphics hardware. In at least one example embodiment, transitioning from a low power mode to a higher power mode comprises increase of power consumed by graphics processing hardware. For example, transitioning from a low power mode to a higher power mode may comprise disablement of a low power mode of the graphics processing hardware, enablement of features of the graphics processing hardware, and/or the like.

As previously described, in some circumstances, power consumed by non-video hardware in a higher power mode may be equivalent to power consumed by non-video hardware in a low power mode. In at least one example embodiment, transitioning from a low power mode to a higher power mode avoids change of power consumed by non-video hardware. For example, transitioning from a low power mode to a higher power mode may preclude disablement of a low power mode of the non-video hardware, preclude enablement of features of the non-video hardware, and/or the like.

In some circumstances, it may be desirable to avoid transitioning between power modes while a user is scanning a room, briefly glancing at various interactable objects, and/or the like. As such, it may be desirable to prevent a head mounted display from transitioning between power modes based, at least in part, on an interactable object briefly being within a field of view of the head mounted display. In this manner, the head mounted display may be prevented from unnecessarily transitioning between power modes when a user wearing the head mounted display does not intend to interact with a particular interactable object. In at least one example embodiment, an apparatus determines that the interactable object is within the field of view of the head mounted display for a threshold duration. In such an example embodiment, the transition of the head mounted display from operation in a power mode to operation in a different power mode may be based, at least in part, on the determination that the interactable object is within the field of view of the head mounted display for the threshold duration. Such a threshold duration may be a minimum amount of time that the interactable object must be within the field of view of the head mounted display before the head mounted display will transition from operation in a power mode to operation in a different power mode. For example, a user peering at an interactable object while wearing the head mounted display for at least the threshold duration may imply that the user desires to interact with the interactable object, and is not merely scanning a room, glancing at the interactable object, quickly turning the user's head such that the interactable object briefly falls within the field of view of the head mounted display, and/or the like.

As discussed previously, a user may desire to interact with an interactable object by way of a head mounted display. For example, the interactable object may be controllable by way of the head mounted display, information associated with the interactable object may be viewable by way of the head mounted display, and/or the like. In at least one example embodiment, an apparatus causes display of at least one user interface element associated with invocation of at least one action associated with the interactable object. In such an example embodiment, the causation of display of the user interface element may be based, at least in part, on the determination that the interactable object is within the field of view of the head mounted display, the transition of the head mounted display from operation in the first power mode to operation in the second power mode, the operation of the head mounted display in the second power mode, and/or the like. The user interface element may, for example, be similar as described regarding the examples of FIGS. 5C-5E.

FIG. 4B is a diagram illustrating a field of view of a head mounted display according to at least one example embodiment. The example of FIG. 4B depicts user 410 wearing head mounted display 412 while standing in a room with interactable object 414. As can be seen in the example of FIG. 4B, interactable object 414 is a television. As can be seen, user 410 is looking towards interactable object 414 while wearing head mounted display 412. In the example of FIG. 4B, it may be inferred that user 410 desires to interact with interactable object 414 by way of head mounted display 412, that interactable object 414 is within a field of view of head mounted display 412, and/or the like. For example, head mounted display 412 may comprise a camera module and may receive information indicative of interactable object 414 being within a field of view of the camera module. In this manner, it may be desirable to operate head mounted display 412 in a power mode that consumes more power than a different power mode such that user 410 may interact with interactable object 414 by way of head mounted display 412, such that user 410 may perceive information associated with interactable object 414 by way of head mounted display 412, such that head mounted display 412 is able to display information associated with interactable object 414, and/or the like.

For example, it may be desirable to operate head mounted display 412 in a higher power mode based, at least in part, on interactable object 414 being within a field of view of head mounted display 412. In this manner, while there fails to be any interactable object within the field of view of head mounted display 412, it may be desirable to conserve battery power by way of operation of the head mounted display in a low power mode. However, when there is an interactable object within the field of view of the head mounted display, it may be desirable to consume more power while the interactable object remains in the field of view of the head mounted display.

In some circumstances, a plurality of interactable objects may be within a field of view of a head mounted display. For example, a user wearing the head mounted display may peer towards a portion of the user's surroundings in which several interactable objects are located. In such circumstances, it may be desirable to facilitate user interaction with any of the interactable objects, with a particular one of the interactable objects, and/or the like. In at least one example embodiment, an apparatus determines that an interactable object and at least another interactable object are within the field of view of the head mounted display. In such an example embodiment, the apparatus may cause display of at least one user interface element associated with invocation of at least one action associated with the interactable object, and cause display of at least another user interface element associated with invocation of at least one action associated with the other interactable object. In such an example, the other user interface element may be displayed at a position on the head mounted display that is adjacent to a display position of the user interface element on the head mounted display. For example, a position of the other user interface element relative to a position of user interface element may correspond with a spatial position of the other interactable object relative to a spatial position of the interactable object.

In another example, the user interface element associated with the interactable object may be caused to be displayed at a central position on the head mounted display, and the other user interface element associated with the other interactable object may be caused to be displayed at a non-central position on the head mounted display. In this manner, certain user interface elements, certain interactable objects, and/or the like may be emphasized over different user interface elements, different interactable objects, and/or the like. Such dynamic emphasis and/or positioning of the user interface elements may be based, at least in part, on a predefined arrangement of user interface elements, a predetermined ranking of interactable objects associated with the user interface elements, a relative position of each interactable object within the field of view of the head mounted display, and/or the like. For example, if an interactable object is near the center of the field of view, the associated user interface element may be displayed near the center of the head mounted display. In such an example, if another interactable object is to the left of the interactable object, another user interface element associated with the other interactable object may be displayed such that the user perceives the other user interface element as being to the left of the user interface element.

FIG. 4C is a diagram illustrating a field of view of a head mounted display according to at least one example embodiment. The example of FIG. 4C depicts user 420 wearing head mounted display 422 while standing in a room with interactable objects 424, 426, 428, and 430. As can be seen in the example of FIG. 4C, interactable object 424 is a television, interactable object 426 is a radio, interactable object 428 is a lamp, and interactable object 430 is an augmented reality content region on a wall. As can be seen, user 420 is looking towards interactable objects 424, 426, 428, and 430 while wearing head mounted display 422. In the example of FIG. 4C, it may be inferred that user 420 desires to interact with one or more of interactable objects 424, 426, 428, and 430 by way of head mounted display 422, that interactable objects 424, 426, 428, and 430 are a least partially within a field of view of head mounted display 422, and/or the like. For example, head mounted display 422 may comprise a camera module and may receive information indicative of at least a portion of interactable objects 424, 426, 428, and 430 being within a field of view of the camera module. In this manner, it may be desirable to operate head mounted display 422 in a power mode that consumes more power than a different power mode such that user 420 may interact with one or more of interactable objects 424, 426, 428, and 430 by way of head mounted display 422, such that user 420 may perceive at least one user interface element associated with any of interactable objects 424, 426, 428, and 430 by way of head mounted display 422, such that head mounted display 422 is able to display information associated with any of interactable objects 424, 426, 428, and 430, and/or the like.

For example, it may be desirable to operate head mounted display 422 in a higher power mode based, at least in part, on any of interactable objects 424, 426, 428, and 430 being within a field of view of head mounted display 422. In this manner, while there fails to be any interactable object within the field of view of head mounted display 422, it may be desirable to conserve battery power by way of operation of the head mounted display in a low power mode. However, when there is an interactable object within the field of view of the head mounted display, it may be desirable to consume more power while the interactable object remains in the field of view of the head mounted display.

As discussed previously, it may be desirable to cause a head mounted display to operate in a higher power mode while an interactable object is within a field of view of the head mounted display. However, if the head mounted display is reoriented such that there fails to be any interactable object within the field of view, it may be desirable to transition the head mounted display from operation in the higher power mode to operation in the low power mode, such that the head mounted display consumes less power than when operating in the higher power mode. In at least one example embodiment, an apparatus determines that the interactable object fails to be within the field of view while the head mounted display is operating in a power mode, such as a higher power mode. In such an example embodiment, the apparatus may transition the head mounted display from operation in the power mode to operation in a different power mode, such as a low power mode, based, at least in part, on the determination that the interactable object fails to be within the field of view, such that the head mounted display consumes less power during operation in the different power mode than during operation in the power mode.

As previously described, in some circumstances, illumination of a display in a higher power mode may be greater than illumination of the display in a low power mode. In at least one example embodiment, transitioning a head mounted display from operation in a higher power mode to operation in a low power mode comprises reduction of illumination of a display. For example, transitioning a head mounted display from operation in a higher power mode to operation in a low power mode may comprise reduction of illumination of the display, termination of illumination of the display, and/or the like.

As previously described, in some circumstances, information rendered by a display in a higher power mode may be greater than information rendered by the display in a low power mode. In at least one example embodiment, transitioning a head mounted display from operation in a higher power mode to operation in a low power mode comprises reduction of information rendered by a display. For example, transitioning the head mounted display from operation in a higher power mode to operation in a low power mode may comprise disablement of the display, termination of rendering at least some information on the display, rendering the information on the display as static information, and/or the like.

As previously described, in some circumstances, power consumed by graphics processing hardware may be reduced, for example, by entering a low power mode of the graphics hardware. In at least one example embodiment, transitioning a head mounted display from operation in a higher power mode to operation in a low power mode comprises reduction of power consumed by graphics processing hardware. For example, transitioning the head mounted display from operation in a higher power mode to operation in a low power mode may comprise enablement of a low power mode of the graphics processing hardware, disablement of one or more features of the graphics processing hardware, and/or the like.

As previously described, in some circumstances, power consumed by non-video hardware in a higher power mode may be equivalent to power consumed by non-video hardware in a low power mode. In at least one example embodiment, transitioning a head mounted display from operation in a higher power mode to operation in a low power mode avoids change of power consumed by non-video hardware. For example, transitioning the head mounted display from operation in a higher power mode to operation in a low power mode may preclude enablement of a low power mode of the non-video hardware, preclude disablement of features of the non-video hardware, and/or the like.

FIGS. 5A-5E are diagrams illustrating interaction indicators and user interface elements according to at least one example embodiment. The examples of FIGS. 5A-5E are merely examples and do not limit the scope of the claims. For example, interaction indicator configuration, arrangement, etc. may vary, head mounted display design, configuration, etc. may vary, user interface element design, configuration, count, etc. may vary, and/or the like.

In some circumstances, it may be desirable to automatically transition a head mounted display from operation in a power mode to operation in a different power mode based, at least in part, on whether an interactable object is within a field of view of the head mounted display. However, in some circumstances, a user may desire to operate the head mounted display in a particular power mode, such as a low power mode, a higher power mode, etc., without such transitioning between power modes. As such, it may be desirable to allow a user to selectively enable, disable, etc. such transitioning between power modes. In at least one example embodiment, an apparatus determines that an automatic transition setting is enabled. In such an example embodiment, the transition of the head mounted display from operation in the first power mode to operation in the second power mode may be based, at least in part, on the determination that the automatic transition setting is enabled. Alternatively, in at least one example embodiment, an apparatus determines that an automatic transition setting is disabled. In such an example embodiment, the transition of the head mounted display from operation in the first power mode to operation in the second power mode may be precluded based, at least in part, on the determination that the automatic transition setting is disabled.

In some circumstances, a user may desire to selectively indicate a desire to transition a head mounted display from operation in a power mode to operation in a different power mode. For example, the user may look towards a particular interactable object and indicate a desire to interact with the particular interactable object by way of an input that indicates the user's desire to interact with the particular interactable object. In at least one example embodiment, an apparatus causes display of an interaction indicator based, at least in part, on the determination that the interactable object is within the field of view of the head mounted display. In such an example embodiment, the interaction indicator may be indicative of the interactable object being within the field of view of the head mounted display, indicative of the head mounted display being configured to interact with the interactable object, indicative of the head mounted display being configured to cause display of a user interface element associated with the interactable object, and/or the like. The interaction indicator may, for example, be associated with a particular interactable object. For example, the interaction indicator may be displayed on the head mounted display such that a user wearing the head mounted display perceives the interaction indicator as corresponding with the interactable object when viewed through the head mounted display, similar as described regarding the examples of FIGS. 3A-3C. In such an example, the user may perceive the interaction indicator associated with the interactable object and desire to indicate the user's desire to interact with the interactable object. In at least one example embodiment, an apparatus receives information indicative of a transition initiation input. In such an example embodiment, transition initiation input may be any input that indicates a user desire to interact with the interactable object, to cause transition of the head mounted display from operation in a power mode to operation in a different power mode, to cause display of at least one user interface element associated with the interactable object, and/or the like. In this manner, the transition of the head mounted display from operation in the power mode to operation in the different power mode, the causation of display of the user interface element associated with the interactable object, and/or the like may be based, at least in part, on the transition initiation input.

FIG. 5A is a diagram illustrating an interaction indicator according to at least one example embodiment. The example of FIG. 5A depicts head mounted display 500 and interaction indicators 502 and 504. As can be seen, interaction indicator 504 is displayed on a portion of a display of head mounted display 500. In this manner, a user wearing head mounted display 500 and peering through the head mounted display may perceive interaction indicator 504 while an interactable object is within a field of view of head mounted display 500. For example, head mounted display 500 may correspond with head mounted display 410 of FIG. 4B. In such an example, as depicted in FIG. 4B, user 410 is looking towards interactable object 414 while wearing head mounted display 412 such that interactable object 414 is within a field of view of head mounted display 412. In this manner, user 410 may perceive interaction indicator 504 that indicates that the user may interact with interactable object 414.

Similarly, as can be seen in the example of FIG. 5A, interaction indicator 502 is visible on a bezel of head mounted display 500. In this manner, a user wearing head mounted display 500 and peering through the head mounted display may perceive interaction indicator 502 while an interactable object is within a field of view of head mounted display 500. Interaction indicator 502 may be displayed by way of a display, a light emitting diode, and/or the like comprised by head mounted display 500. For example, head mounted display 500 may correspond with head mounted display 410 of FIG. 4B. In such an example, as depicted in FIG. 4B, user 410 is looking towards interactable object 414 while wearing head mounted display 412 such that interactable object 414 is within a field of view of head mounted display 412. In this manner, user 410 may perceive interaction indicator 502 that indicates that the user may interact with interactable object 414.

In some circumstances, it may be desirable to identify a particular interactable object for interaction by way of an indicator displayed by way of the interactable object. For example, an interactable object may be caused to display an interaction indicator that indicates that the particular interactable object is currently within a field of view of a head mounted display, to indicate that receipt of an input from the user will cause selection of the particular interactable object such that at least one user interface element associated with the interactable object is caused to be displayed, and/or the like. In at least one example embodiment, an interactable object is a separate apparatus. In such an example embodiment, the apparatus may cause sending of an interaction indicator directive to the separate apparatus based, at least in part, on the determination that the interactable object is within the field of view of the head mounted display. The interaction indicator directive may, for example, be configured to cause the separate apparatus to cause display of an interaction indicator. In such an example embodiment, the apparatus may receive information indicative of a transition initiation input. In this manner, the transition of the head mounted display from operation in a power mode to operation in a different power mode, the operation of the head mounted display in the different power mode, the causation of display of at least one user interface element associated with the interactable object, and/or the like may be based, at least in part, on the transition initiation input.

In some circumstances, more than one user may be wearing a head mounted display in the same general area. In such an example, a user and another user may desire to interact with various interactable objects. As such, it may be desirable to configure an apparatus such that the user and the other user may identify which user is currently interacting with a particular interactable object, to identify which interactable object is in a field of view of which user's head mounted display, and/or the like. As such, in order to facilitate such distinguishment between the user and the other user, it may be desirable to utilize different colored interaction indicators for different users. In at least one example embodiment, the apparatus causes sending of an interaction indicator directive to the separate apparatus based, at least in part, on the determination that the interactable object is within the field of view of the head mounted display. The interaction indicator directive may, for example, be configured to cause the separate apparatus to cause display of an interaction indicator in a particular color that is indicated by the interaction indicator directive.

FIG. 5B is a diagram illustrating an interaction indicator according to at least one example embodiment. The example of FIG. 5B depicts interactable object 510 and interaction indicator 512. As can be seen, in the example of FIG. 5B, interactable object 510 is a television. Although depicted as a television, interactable object 510 may be any time of interactable object. As can be seen, interaction indicator 512 indicates that interactable object 510 is within a field of view of a head mounted display. For example, interactable object 510 may correspond with interactable object 412 of FIG. 4B. In this manner, interactable object 412 of FIG. 4B may be caused to actuate a light emitting diode, a display, etc. in accordance with an interaction indicator directive. For example, head mounted display 412 of FIG. 4B may send the interaction indicator directive to interactable object 414 such that interactable object 414 causes display of an interaction indicator, causes display of an interaction indicator in a specified color, and/or the like.

As described previously, in some circumstances, a head mounted display may be caused to display at least one user interface element associated with invocation of at least one action associated with an interactable object.

FIG. 5C is a diagram illustrating a user interface element according to at least one example embodiment. The example of FIG. 5C depicts display 520 (e.g. a display comprised by a head mounted display, such as head mounted display 414 of FIG. 4B) displaying user interface element 522. As can be seen, user interface element 522 is associated with invocation of a power-on and/or power-off action associated with an interactable object, such as interactable object 414 of FIG. 4B. In this manner, user 410 of FIG. 4B may perceive user interface element 522 of FIG. 5C in response to interactable object 414 of FIG. 4B being within a field of view of head mounted display 412 of FIG. 4B. In this example of FIG. 5C, a user may invoke one or more actions associated with user interface element 522 such that the user may interact with, control, etc. an interactable object associated with user interface element 522.

As discussed previously, in some circumstances, a particular interactable object may be associated with a plurality of user interface elements, a plurality of actions, and/or the like. FIG. 5D is a diagram illustrating user interface elements according to at least one example embodiment. The example of FIG. 5D depicts display 530 (e.g. a display comprised by a head mounted display, such as head mounted display 414 of FIG. 4B) displaying user interface elements 522, 524, 526, and 528. As can be seen, user interface element 522 is associated with invocation of a power-on and/or power-off action associated with an interactable object, user interface element 524 is associated with invocation of a volume-related action associated with an inter-actable object, user interface element 526 is associated with invocation of a video-related action associated with an interactable object, and user interface element 528 is associated with invocation of a television-related action associated with an interactable object. In this manner, all of user interface elements 522, 524, 526, and 528 may be associated with actions associated with a single interactable object, such as interactable object 414 of FIG. 4B. In this manner, user 410 of FIG. 4B may perceive user interface elements 522, 524, 526, and 528 of FIG. 5D in response to interactable object 414 of FIG. 4B being within a field of view of head mounted display 412 of FIG. 4B. In this example of FIG. 5D, a user may invoke one or more actions associated with user interface elements 522, 524, 526, and 528 such that the user may interact with, control, etc. the interactable object associated with user interface elements 522, 524, 526, and 528.

As discussed previously, in some circumstances, a plurality of interactable objects may be within a field of view of a head mounted display. FIG. 5E is a diagram illustrating user interface elements according to at least one example embodiment. The example of FIG. 5E depicts display 540 (e.g. a display comprised by a head mounted display, such as head mounted display 424 of FIG. 4C) displaying user interface elements 522, 524, 526, and 528, user interface element 542, and user interface element 544.

As can be seen, user interface element 522 is associated with invocation of a power-on and/or power-off action associated with an interactable object, user interface element 524 is associated with invocation of a volume-related action associated with an interactable object, user interface element 526 is associated with invocation of a video-related action associated with an interactable object, and user interface element 528 is associated with invocation of a television-related action associated with an interactable object. In this manner, all of user interface elements 522, 524, 526, and 528 may be associated with actions associated with a single interactable object, such as interactable object 424 of FIG. 4C. In this manner, user 420 of FIG. 4C may perceive user interface elements 522, 524, 526, and 528 of FIG. 5D in response to interactable object 424 of FIG. 4C being within a field of view of head mounted display 422 of FIG. 4C. In this example of FIG. 5E, a user may invoke one or more actions associated with user interface elements 522, 524, 526, and 528 such that the user may interact with, control, etc. the interactable object associated with user interface elements 522, 524, 526, and 528.

As can be seen in the example of FIG. 5E, user interface element 542 is displayed at a position to the left of user interface elements 522, 524, 526, and 528, and user interface element 544 is displayed at a position to the right of user interface elements 522, 524, 526, and 528. In this manner, the relative position of each grouping of user interface elements may be indicative of a relative position of interactable objects in the environment surrounding the user. For example, as can be seen in the example of FIG. 4C, interactable object 426, a radio, is positioned to the left of interactable object 424, a television, and interactable object 428, a lamp, is positioned to the right of interactable object 424. In this manner, user interface element 542 may be associated with interactable object 426 of FIG. 4C and user interface element 544 may be associated with interactable object 428 of FIG. 4C. For example, user interface element 542 may be associated with a music-related action associated with interactable object 426 of FIG. 4C, and user interface element 544 may be associated with a light-related action of interactable object 428 of FIG. 4C. For example, user interface element 542 may toggle reproduction of music by interactable object 426 of FIG. 4C, may select a source of music associated with interactable object 426 of FIG. 4C, and/or the like. For example, user interface element 544 may toggle a light comprised by interactable object 428 of FIG. 4C, may dim and/or brighten the light comprised by interactable object 428 of FIG. 4C, and/or the like.

Figure 6:
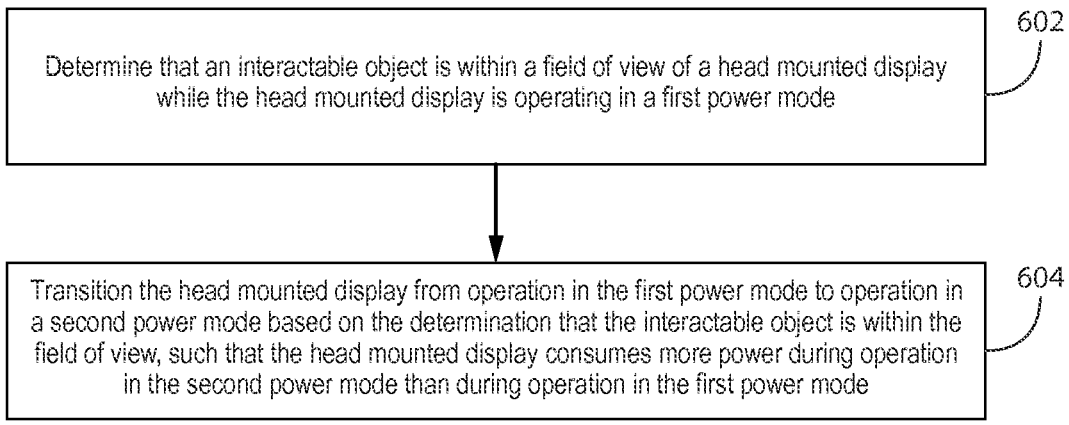
FIG. 6 is a flow diagram illustrating activities associated with transitioning of a head mounted display from operation in a first power mode to operation in a second power mode, such that the head mounted display consumes more power during operation in the second power mode than during operation in the first power mode according to at least one example embodiment.

FIG. 6 is a flow diagram illustrating activities associated with transitioning of a head mounted display from operation in a first power mode to operation in a second power mode, such that the head mounted display consumes more power during operation in the second power mode than during operation in the first power mode according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

As discussed previously, in some circumstances, it may be desirable to transition a head mounted display from operation in a first power mode to operation in a second power mode such that the head mounted display consumes more power during operation in the second power mode than during operation in the first power mode.

At block 602, the apparatus determines that an interactable object is within a field of view of a head mounted display while the head mounted display is operating in a first power mode. The determination, the interactable object, the field of view, the head mounted display, and the first power mode may be similar as described regarding the examples of FIGS. 3A-3C, FIGS. 4A-4C, and FIGS. 5A-5E.

At block 604, the apparatus transitions the head mounted display from operation in the first power mode to operation in a second power mode based, at least in part, on the determination that the interactable object is within the field of view. In at least one example embodiment, the head mounted display consumes more power during operation in the second power mode than during operation in the first power mode. The transition and the second power mode may be similar as described regarding the examples of FIGS. 3A-3C, FIGS. 4A-4C, and FIGS. 5A-5E.

Figure 7:
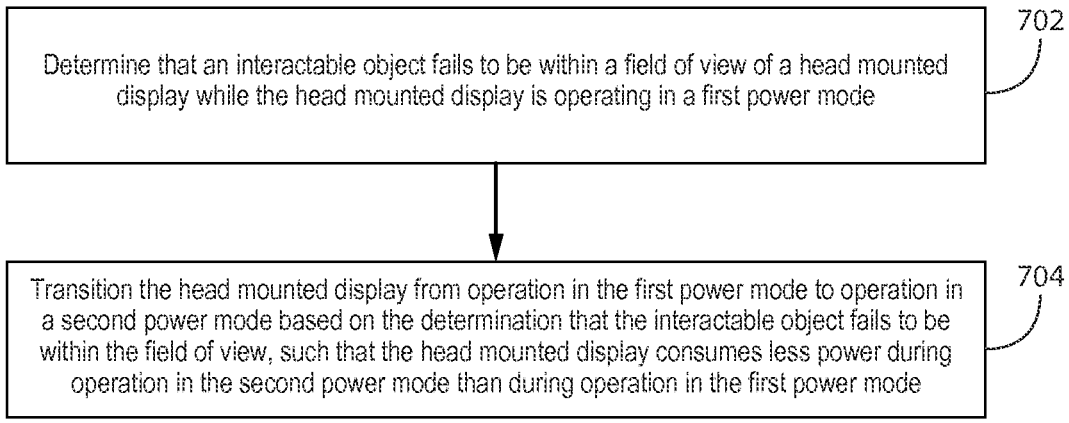
FIG. 7 is a flow diagram illustrating activities associated with transitioning of a head mounted display from operation in a first power mode to operation in a second power mode, such that the head mounted display consumes less power during operation in the second power mode than during operation in the first power mode according to at least one example embodiment.

FIG. 7 is a flow diagram illustrating activities associated with transitioning of a head mounted display from operation in a first power mode to operation in a second power mode, such that the head mounted display consumes less power during operation in the second power mode than during operation in the first power mode according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As discussed previously, in some circumstances, it may be desirable to transition a head mounted display from operation in a first power mode to operation in a second power mode such that the head mounted display consumes less power during operation in the second power mode than during operation in the first power mode.

At block 702, the apparatus determines that an interactable object fails to be within a field of view of a head mounted display while the head mounted display is operating in a first power mode. The determination, the interactable object, the field of view, the head mounted display, and the first power mode may be similar as described regarding the examples of FIGS. 3A-3C, FIGS. 4A-4C, and FIGS. 5A-5E.

At block 704, the apparatus transitions the head mounted display from operation in the first power mode to operation in a second power mode based, at least in part, on the determination that the interactable object fails to be within the field of view. In at least one example embodiment, the head mounted display consumes less power during operation in the second power mode than during operation in the first power mode. The transition and the second power mode may be similar as described regarding the examples of FIGS. 3A-3C, FIGS. 4A-4C, and FIGS. 5A-5E.

Figure 8:
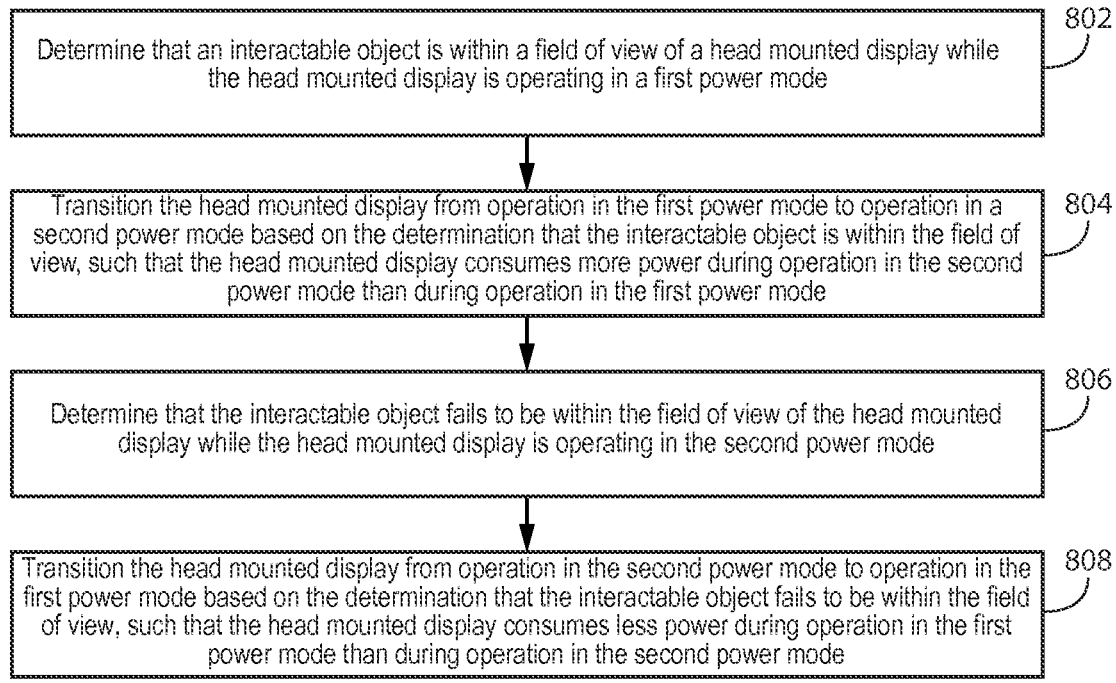
FIG. 8 is a flow diagram illustrating activities associated with transitioning of a head mounted display from operation in a first power mode to operation in a second power mode and transitioning of the head mounted display from operation in the second power mode to operation in the first power mode according to at least one example embodiment.

FIG. 8 is a flow diagram illustrating activities associated with transitioning of a head mounted display from operation in a first power mode to operation in a second power mode and transitioning of the head mounted display from operation in the second power mode to operation in the first power mode according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As discussed previously, in some circumstances, it may be desirable to transition a head mounted display between operation in a first power mode and operation in a second power mode based, at least in part, on whether an interactable object is within a field of view of the head mounted display.

At block 802, the apparatus determines that an interactable object is within a field of view of a head mounted display while the head mounted display is operating in a first power mode. The determination, the interactable object, the field of view, the head mounted display, and the first power mode may be similar as described regarding the examples of FIGS. 3A-3C, FIGS. 4A-4C, and FIGS. 5A-5E.

At block 804, the apparatus transitions the head mounted display from operation in the first power mode to operation in a second power mode based, at least in part, on the determination that the interactable object is within the field of view. In at least one example embodiment, the head mounted display consumes more power during operation in the second power mode than during operation in the first power mode. The transition and the second power mode may be similar as described regarding the examples of FIGS. 3A-3C, FIGS. 4A-4C, and FIGS. 5A-5E.

At block 806, the apparatus determines that the interactable object fails to be within the field of view of the head mounted display while the head mounted display is operating in the second power mode. The determination may be similar as described regarding the examples of FIGS. 3A-3C, FIGS. 4A-4C, and FIGS. 5A-5E.

At block 808, the apparatus transitions the head mounted display from operation in the second power mode to operation in the first power mode based, at least in part, on the determination that the interactable object fails to be within the field of view. In at least one example embodiment, the head mounted display consumes less power during operation in the first power mode than during operation in the second power mode. The transition and the second power mode may be similar as described regarding the examples of FIGS. 3A-3C, FIGS. 4A-4C, and FIGS. 5A-5E.

Figure 9:
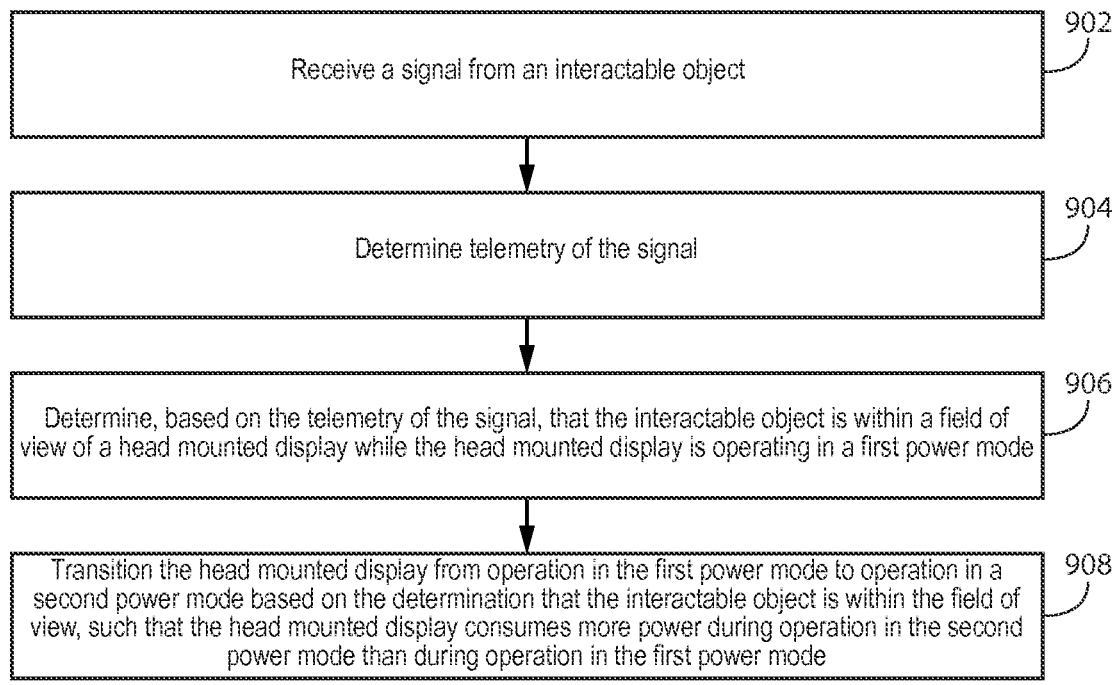
FIG. 9 is a flow diagram illustrating activities associated with transitioning of a head mounted display from operation in a first power mode to operation in a second power mode, such that the head mounted display consumes more power during operation in the second power mode than during operation in the first power mode according to at least one example embodiment.

FIG. 9 is a flow diagram illustrating activities associated with transitioning of a head mounted display from operation in a first power mode to operation in a second power mode, such that the head mounted display consumes more power during operation in the second power mode than during operation in the first power mode according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As discussed previously, in some circumstances, it may be desirable to determine that an interactable object is within a field of view of a head mounted display based, at least in part, on telemetry of a signal received from the interactable object.

At block 902, the apparatus receives a signal from an interactable object. The receipt, the signal, and the interactable object may be similar as described regarding the examples of FIG. 2, FIGS. 3A-3C, FIGS. 4A-4C, and FIGS. 5A-5E.

At block 904, the apparatus determines telemetry of the signal. The determination and the telemetry may be similar as described regarding the examples of FIG. 2, FIGS. 3A-3C, FIGS. 4A-4C, and FIGS. 5A-5E.

At block 906, the apparatus determines that the interactable object is within a field of view of a head mounted display while the head mounted display is operating in a first power mode. In at least one example embodiment, the determination that the interactable object is within the field of view of the head mounted display is based, at least in part, on the telemetry of the signal. The determination and the field of view, the head mounted display, and the first power mode may be similar as described regarding the examples of FIGS. 3A-3C, FIGS. 4A-4C, and FIGS. 5A-5E.

At block 908, the apparatus transitions the head mounted display from operation in the first power mode to operation in a second power mode based, at least in part, on the determination that the interactable object is within the field of view. In at least one example embodiment, the head mounted display consumes more power during operation in the second power mode than during operation in the first power mode. The transition and the second power mode may be similar as described regarding the examples of FIGS. 3A-3C, FIGS. 4A-4C, and FIGS. 5A-5E.

Figure 10:
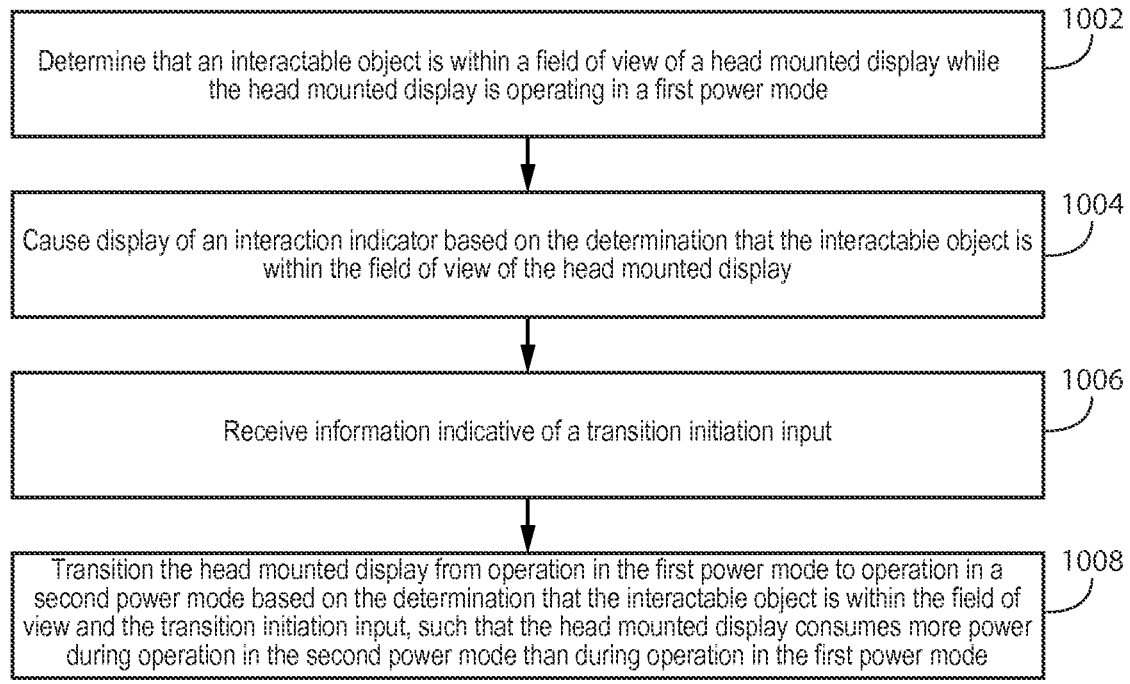
FIG. 10 is a flow diagram illustrating activities associated with transitioning of a head mounted display from operation in a first power mode to operation in a second power mode, such that the head mounted display consumes more power during operation in the second power mode than during operation in the first power mode according to at least one example embodiment.

FIG. 10 is a flow diagram illustrating activities associated with transitioning of a head mounted display from operation in a first power mode to operation in a second power mode, such that the head mounted display consumes more power during operation in the second power mode than during operation in the first power mode according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As described previously, in some circumstances, it may be desirable to transition a head mounted display from operation in a first power mode to operation in a second power mode based, at least in part, on a transition initiation input.

At block 1002, the apparatus determines that an interactable object is within a field of view of a head mounted display while the head mounted display is operating in a first power mode. The determination, the interactable object, the field of view, the head mounted display, and the first power mode may be similar as described regarding the examples of FIGS. 3A-3C, FIGS. 4A-4C, and FIGS. 5A-5E.

At block 1004, the apparatus causes display of an interaction indicator based, at least in part, on the determination that the interactable object is within the field of view of the head mounted display. The causation of display and the interaction indicator may be similar as described regarding the examples of FIGS. 3A-3C, FIGS. 4A-4C, and FIGS. 5A-5E.

At block 1006, the apparatus receives information indicative of a transition initiation input. The receipt and the transition initiation input may be similar as described regarding the examples of FIG. 2, FIGS. 3A-3C, FIGS. 4A-4C, and FIGS. 5A-5E.

At block 1008, the apparatus transitions the head mounted display from operation in the first power mode to operation in a second power mode based, at least in part, on the determination that the interactable object is within the field of view and the transition initiation input. In at least one example embodiment, the head mounted display consumes more power during operation in the second power mode than during operation in the first power mode. The transition and the second power mode may be similar as described regarding the examples of FIGS. 3A-3C, FIGS. 4A-4C, and FIGS. 5A-5E.

Figure 11:
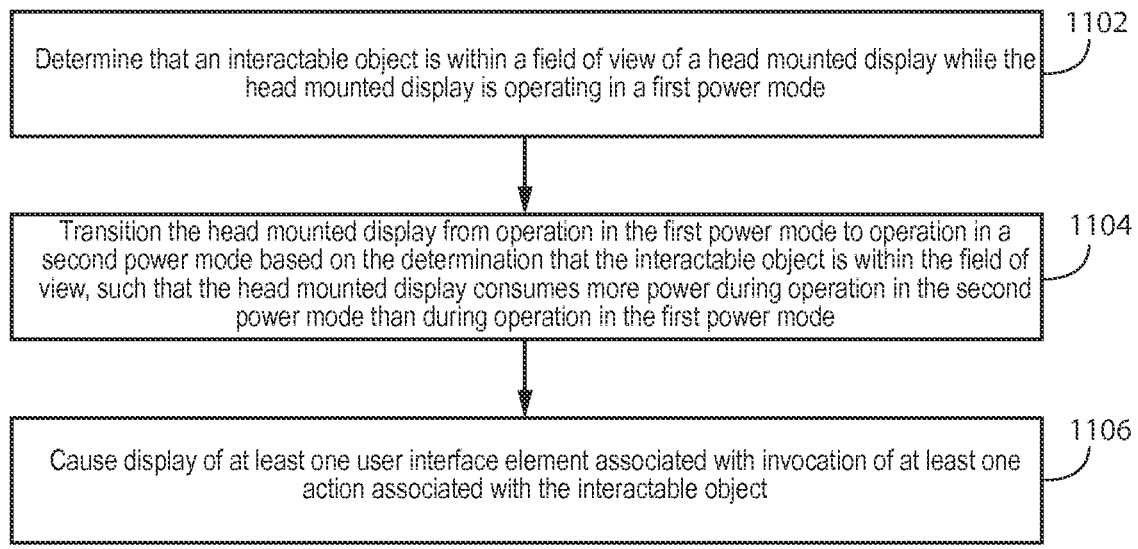
FIG. 11 is a flow diagram illustrating activities associated with causation of display of at least one user interface element associated with invocation of at least one action associated with an interactable object according to at least one example embodiment.

FIG. 11 is a flow diagram illustrating activities associated with causation of display of at least one user interface element associated with invocation of at least one action associated with an interactable object according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As described previously, in some circumstances, it may be desirable to cause display of at least one user interface element associated with invocation of at least one action associated with an interactable object.

At block 1102, the apparatus determines that an interactable object is within a field of view of a head mounted display while the head mounted display is operating in a first power mode. The determination, the interactable object, the field of view, the head mounted display, and the first power mode may be similar as described regarding the examples of FIGS. 3A-3C, FIGS. 4A-4C, and FIGS. 5A-5E.

At block 1104, the apparatus transitions the head mounted display from operation in the first power mode to operation in a second power mode based, at least in part, on the determination that the interactable object is within the field of view. In at least one example embodiment, the head mounted display consumes more power during operation in the second power mode than during operation in the first power mode. The transition and the second power mode may be similar as described regarding the examples of FIGS. 3A-3C, FIGS. 4A-4C, and FIGS. 5A-5E.

At block 1106, the apparatus causes display of at least one user interface element associated with invocation of at least one action associated with the interactable object. In at least one example embodiment, the causation of display of the user interface element is based, at least in part, on the determination that the interactable object is within the field of view. In at least one example embodiment, the causation of display of the user interface element is based, at least in part, on the transition of the head mounted display from operation in the first power mode to operation in the second power mode. In at least one example embodiment, the causation of display of the user interface element is based, at least in part, on the operation of the head mounted display in the second power mode. The causation of display, the user interface element, and the action may be similar as described regarding the examples of FIGS. 3A-3C, FIGS. 4A-4C, and FIGS. 5A-5E.

One or more example embodiments may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 1004 of FIG. 10 may be performed after block 1006 of FIG. 10. Furthermore, if desired, one or more of the above-described functions may be optional or may be combined. For example, block 904 of FIG. 9 may be optional and/or combined with block 902 of FIG. 9.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. A method, comprising:
    determining that an interactable object is within a field of view of a head mounted display while the head mounted display is operating in a first power mode; and
    transitioning the head mounted display from operation in the first power mode to operation in a second power mode based, at least in part, on the determination that the interactable object is within the field of view, such that the head mounted display consumes more power during operation in the second power mode than during operation in the first power mode.

2. The method of claim 1, wherein the determination that the interactable object is within the field of view of the head mounted display comprises:
    receiving a signal from the interactable object;
    determining telemetry of the signal; and
    determining that the interactable object is within the field of view of the head mounted display based, at least in part, on the telemetry of the signal.

3. The method of claim 2, wherein the signal comprises a Bluetooth signal, the determination of the telemetry of the signal comprises determining an angle-of-arrival of the Bluetooth signal from the interactable object, and the determination that the interactable object is within the field of view of the head mounted display is based, at least in part, on the angle-of-arrival of the Bluetooth signal.

4. The method of claim 2, wherein the signal comprises an audio signal, and the determination of the telemetry of the signal comprises determining an interactable object location based, at least in part, on the audio signal, and the determination that the interactable object is within the field of view of the head mounted display is based, at least in part, on the interactable object location.

5. The method of claim 1, further comprising causing display of an interaction indicator based, at least in part, on the determination that the interactable object is within the field of view of the head mounted display, the interaction indicator being indicative of the interactable object being within the field of view of the head mounted display.

6. The method of claim 5, further comprising receiving information indicative of a transition initiation input, wherein the transition of the head mounted display from operation in the first power mode to operation in the second power mode is based, at least in part, on the transition initiation input.

7. The method of claim 1, wherein the interactable object comprises a separate apparatus, and the method further comprising causing sending of an interaction indicator directive to the separate apparatus based, at least in part, on the determination that the interactable object is within the field of view of the head mounted display, the interaction indicator directive being configured to cause the separate apparatus to cause display of an interaction indicator.

8. The method of claim 1, wherein the determination that the interactable object is within the field of view of the head mounted display comprises determining that the interactable object is within the field of view of the head mounted display for a threshold duration, wherein the transition of the head mounted display from operation in the first power mode to operation in the second power mode is based, at least in part, on the determination that the interactable object is within the field of view of the head mounted display for the threshold duration.

9. The method of claim 1, further comprising causing display of at least one user interface element associated with invocation of at least one action associated with the interactable object based, at least in part, on the operation of the head mounted display in the second power mode.

10. The method of claim 9, further comprising:
  determining that at least another interactable object is within the field of view of the head mounted display; and
  causing display of at least another user interface element associated with invocation of at least one action associated with the other interactable object.

11. The method of claim 10, wherein the other user interface element is displayed at a position on the head mounted display that is adjacent to a display position of the user interface element on the head mounted display.

12. The method of claim 1, further comprising:
  determining that the interactable object fails to be within the field of view while the head mounted display is operating in the second power mode; and
  transitioning the head mounted display from operation in the second power mode to operation in the first power mode based, at least in part, on the determination that the interactable object fails to be within the field of view, such that the head mounted display consumes less power during operation in the first power mode than during operation in the second power mode.

13. An apparatus, comprising:
  at least one processor; and
  at least one memory including computer program code;
  the at least one memory and the computer program code configured to, with the at least one processor, cause the apparatus to perform
  determining that an interactable object is within a field of view of a head mounted display while the head mounted display is operating in a first power mode; and
  transitioning the head mounted display from operation in the first power mode to operation in a second power mode based, at least in part, on the determination that the interactable object is within the field of view, such that the head mounted display consumes more power during operation in the second power mode than during operation in the first power mode.

14. A computer program embodied on a non-transitory computer-readable medium, said computer readable medium being encoded with instructions that, when executed on a processor, control the processor to perform:
  determining that an interactable object is within a field of view of a head mounted display while the head mounted display is operating in a first power mode; and
  transitioning the head mounted display from operation in the first power mode to operation in a second power mode based, at least in part, on the determination that the interactable object is within the field of view, such that the head mounted display consumes more power during operation in the second power mode than during operation in the first power mode.

* * * * *